(12) United States Patent
Zhang et al.

(10) Patent No.: US 12,204,760 B2
(45) Date of Patent: Jan. 21, 2025

(54) METHOD AND DEVICE OF STORAGE DATA

(71) Applicant: SAMSUNG ELECTRONICS CO., LTD., Suwon-si (KR)

(72) Inventors: Ting Zhang, Shaanxi (CN); Sizhe Xiong, Shaanxi (CN); Weibang Liu, Shaanxi (CN)

(73) Assignee: Samsung Electronics Co., Ltd. (KR)

( * ) Notice: Subject to any disclaimer, the term of this patent is extended or adjusted under 35 U.S.C. 154(b) by 0 days.

(21) Appl. No.: 17/972,846

(22) Filed: Oct. 25, 2022

(65) Prior Publication Data

US 2023/0393749 A1 Dec. 7, 2023

(30) Foreign Application Priority Data

Jun. 2, 2022 (CN) .......................... 202210626020.4

(51) Int. Cl.
*G06F 3/06* (2006.01)

(52) U.S. Cl.
CPC .......... *G06F 3/0613* (2013.01); *G06F 3/0659* (2013.01); *G06F 3/068* (2013.01)

(58) Field of Classification Search
None
See application file for complete search history.

(56) References Cited

U.S. PATENT DOCUMENTS

| | | | |
|---|---|---|---|
| 7,676,626 B2 | 3/2010 | Lee et al. | |
| 2008/0244164 A1* | 10/2008 | Chang | G06F 12/0246 711/E12.001 |
| 2010/0169604 A1* | 7/2010 | Trika | G06F 12/0246 711/170 |
| 2011/0161556 A1* | 6/2011 | Strope | G06F 12/0246 711/E12.008 |
| 2014/0281158 A1* | 9/2014 | Ravimohan | G06F 12/0246 711/103 |
| 2015/0254555 A1* | 9/2015 | Williams, Jr. | G06N 3/045 706/14 |
| 2019/0294363 A1* | 9/2019 | Caraccio | G06F 3/0649 |
| 2020/0249875 A1 | 8/2020 | Zhou et al. | |
| 2020/0302216 A1* | 9/2020 | He | H04L 47/2441 |
| 2021/0048952 A1 | 2/2021 | Cariello | |
| 2021/0141553 A1 | 5/2021 | Yoo et al. | |
| 2021/0181975 A1 | 6/2021 | Bhoopali et al. | |
| 2021/0210136 A1 | 7/2021 | Rao | |
| 2022/0004495 A1* | 1/2022 | Natarajan | G06F 12/123 |
| 2023/0120862 A1* | 4/2023 | Gao | G06F 16/148 711/154 |
| 2023/0359365 A1* | 11/2023 | Wang | G06F 3/0659 |

FOREIGN PATENT DOCUMENTS

| | | |
|---|---|---|
| CN | 107832007 A | 3/2018 |
| CN | 110209356 A | 9/2019 |

* cited by examiner

*Primary Examiner* — Yaima Rigol
(74) *Attorney, Agent, or Firm* — Fish & Richardson P.C.

(57) ABSTRACT

A method of storing data includes: determining the write priority of data, in response to a write request for data by a host; writing the data into a first type of memory cell, in response to the write priority of data being a first write priority; and writing the data into a second type of memory cell, in response to the write priority of data being a second write priority. The second write priority is higher than the first write priority, and the write speed of the second type of memory cell is higher than the write speed of the first type of memory cell.

17 Claims, 11 Drawing Sheets

METHOD AND DEVICE OF STORAGE DATA

CROSS-REFERENCE TO RELATED APPLICATION

This application is based on and claims priority under 35 U.S.C. § 119 to Chinese Patent Application No. 202210626020.4, filed on Jun. 6, 2022, in the Chinese Patent Office, the disclosure of which is incorporated by reference herein in its entirety.

TECHNICAL FIELD

The present disclosure relates to the field of storage and, more particularly, to a method and a device of storing data.

BACKGROUND ART

Recently, storage devices (such as Solid State Drive (SSD), Non-Volatile Memory express (NVMe), Embedded Multi-Media Card (eMMC), Universal flash memory (UFS), etc.) have been widely used. For example, storage devices may be implemented in various types of devices such as personal computers (PCs), server devices, mobile devices, embedded devices, and the like.

Based on the considerations of storage capacity and costs, many storage devices use memory cells of a plurality of processes (e.g., Single-Level Cell (SLC), Multi-Level Cell (MLC), Trinary-Level Cell (TLC) and Quad-Level Cell (QLC), etc.).

In conventional storage devices using the memory cells of a plurality of processes, the memory cells of one process are generally used for a period to store data and the memory cells of another process are used to store data for another period. The above method of storing data selectively uses memory cells of different processes to store data only according to time periods, therefore, it is difficult to improve the performance and/or user experience of the storage device.

SUMMARY

The present disclosure has an object to provide a method and a device of storing data.

According to an aspect of the present disclosure, a method of storing data comprises: determining a write priority of the data, in response to a host's write request for data; writing the data into a first type of memory cell, in response to the write priority of the data being a first write priority; and writing the data into a second type of memory cell, in response to the write priority of the data being a second write priority. The second write priority is higher than the first write priority, and a write speed of the second type of memory cell is higher than a write speed of the first type of memory cell.

According to an aspect of the present disclosure, a device of storing data comprises: a priority determination module configured to determine a write priority of the data in response to a host's write request for data; a write module configured to: write the data into the first type of memory cell, in response to the write priority of the data being a first write priority; and write the data into a second type of memory cell, in response to the write priority of the data being a second write priority. The second write priority is higher than the first write priority, and a write speed of the second type of memory cell is higher than a write speed of the first type of memory cell.

According to the method of storing data of an exemplary embodiment of the present disclosure, the data may be stored in the memory cell (e.g., a first type of memory cell or a second type of memory cell) corresponding to the write priority of data according to the write priority of data; therefore, the performance and/or user experience of storage devices using a plurality of types of memory cells can be improved.

According to the method of storing data of an exemplary embodiment of the present disclosure, the data may be stored in the memory cell (e.g., a first type of memory cell or a second type of memory cell) corresponding to the write priority of the data according to the write priority of the data determined based on the first data feature of the data. Therefore, different write strategies may be used according to different data (for example, data that needs to be written quickly is written to the second type of memory cell with a high write speed and data that does not need to be written quickly is written to the memory cell with a low write speed), so that the maximum utilization of the first type of memory cell and the second type of memory cell can be achieved and the writing performance can be improved.

According to the method of storing data of the exemplary embodiment of the present disclosure, when the application to which the data belongs is an application that needs to write data quickly, the write priority of the data may be determined as a high write priority (for example, the second write priority) and the data may be written to the second type of memory cell with the high write speed. When the application to which the data belongs is an application that does not need to write data quickly, the write priority of the data may be determined as a low write priority (e.g., the first write priority) and the data may be written to the first type of memory cell with the low write speed; therefore, the first type of memory cell and the second type of memory cell may be used more reasonably based on the application to which the data belongs.

According to the method of storing data of the exemplary embodiment of the present disclosure, the application to which the data belongs may be identified by a pre-trained application identification model; therefore, it is possible to accurately identify the application to which the data belongs.

According to the method of storing data of the exemplary embodiment of the present disclosure, data writing may be performed based on an optimal preset write strategy among various write strategies obtained through iterative testing; therefore, it is possible to improve the performance of the storage device.

According to the method of storing data of the exemplary embodiment of the present disclosure, the second data feature with respect to different applications may be used to further determine the write priority of the data and the use of the first type of memory cell and the second type of memory cell can be optimized, thereby improving the write performance and service life.

According to the method of storing data of the exemplary embodiment of the present disclosure, in the case where the write booster function is turned on, the data may be stored in the memory cell corresponding to the write priority of the data according to the write priority of the data, rather than writing all of the data to the second type of memory cell (e.g., SLC); therefore, the amount of the data written to the second type of memory cell may be reduced, thereby extending the service life of the second type of memory cell and improving writing performance.

BRIEF DESCRIPTION OF DRAWINGS

The above and other objects and features of the present disclosure will become clearer through the following description in conjunction with the drawings that exemplarily illustrate an embodiment, wherein.

DETAILED DESCRIPTION OF EXEMPLARY EMBODIMENTS

Based on the considerations of storage capacity and costs, many storage devices use memory cells of a plurality of processes, such as at least two of Single-Level Cell (SLC), Multi-Level Cell (MLC), Trinary-Level Cell (TLC), and Quad-Level Cell (QLC). The storage performances of memory cells of different processes are different, for example, the balance of speed, storage capacity cost, and storage performance are urgent problems to be solved. Based on this, the present disclosure proposes a method of storing data. Hereinafter, examples will be described in detail with reference to the drawings.

Figure 1:
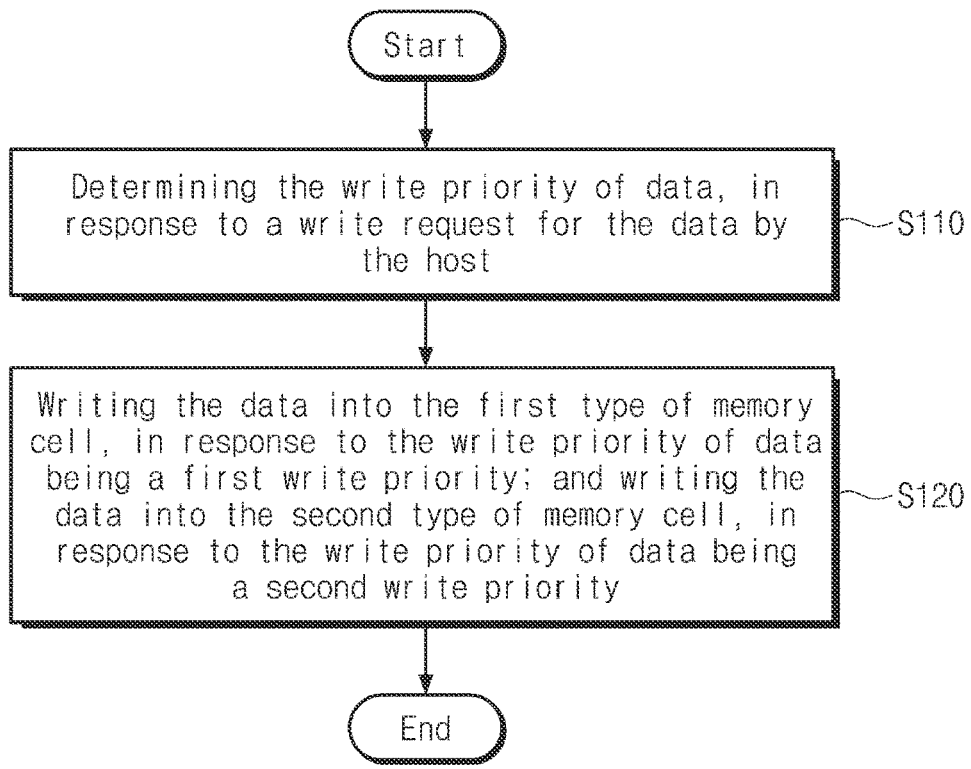
FIG. 1 is a flowchart illustrating a method of storing data according to an exemplary embodiment of the present disclosure.

FIG. 1 is a flowchart illustrating a method of storing data according to an exemplary embodiment of the present disclosure.

Referring to FIG. 1, in step S110, a write priority of data is determined, in response to a write request for the data by the host.

The write priority of the data may indicate the desired speed at which the data is written. For example, data with a high write priority may be written at a higher speed than data with a low write priority.

In one embodiment, the first data feature of the data may be obtained, the write priority of the data may be determined based on the first data feature of the data, and the first data feature may include a file type and a synchronous write ratio.

The file type may indicate the format and/or category of the data. In one example, the file types of the data may include video files, voice files, image files, text files, and the like. However, the above example is only an example and the file types of the data of the present disclosure are not limited thereto and may be one or more other file types related to the data.

In one example, the synchronous write ratio may be the synchronous write ratio within a single cycle. For example, the synchronous write ratio may include an fsync ratio. However, the synchronous write ratio of the present disclosure is not limited thereto and may be the synchronous write ratio defined in any other manner.

Alternatively, the first data feature of the data may further include one or more of the following features: time attribute information, a file system type, a synchronization identifier of a database file, a data synchronization identifier, a master device number, a slave device number, a logical block address sector number, a write data size, and a process priority. However, the first data feature of the data of the present disclosure is not limited to the above examples but may also be one or more other features related to the features of the data (e.g., writing or storage). For example, only as an example, the first data feature of data may include at least one of a ratio of hot to cold data, an input and output size, and a data size.

As an example, the first data feature of the data may be obtained based on a write request for the data by the host. In one example, the first data feature of data may be obtained by analyzing the write request for the data by the host or I/O data. However, the manner of obtaining the first data feature of data of the present disclosure is not limited thereto and may be any other known manner.

In operation S120, the data is written into the first type of memory cell, in response to the write priority of data being a first write priority; and the data is written into the second type of memory cell, in response to the write priority of data being a second write priority.

Herein, the second write priority may be higher than the first write priority, and the write speed of the second type of memory cell may be higher than the write speed of the first type of memory cell. In one example, the first type of memory cell and the second type of memory cell may be two of SLC, MLC, TLC, and QLC. However, the present disclosure is not limited to the above examples.

According to the method of storing the data of the present disclosure, it is possible to store data in the memory cell (e.g., a first type of memory cell or a second type of memory cell) corresponding to the write priority of data according to the write priority of data; therefore, the performance and/or user experience of storage devices using a plurality of types of memory cells can be improved.

In addition, according to the method of storing data of the present disclosure, it is possible to store data in the memory cell (e.g., a first type of memory cell or a second type of memory cell) corresponding to the write priority of data according to the write priority of data determined based on the first data feature of data and, therefore, different write strategies may be used according to different data (for example, data that needs to be written quickly is written to the second type of memory cell with the high write speed and data that does not need to be written quickly is written to the memory cell with the low write speed), so that the maximum utilization of the first type of memory cell and the second type of memory cell can be achieved and the writing performance can be improved.

Figure 2:
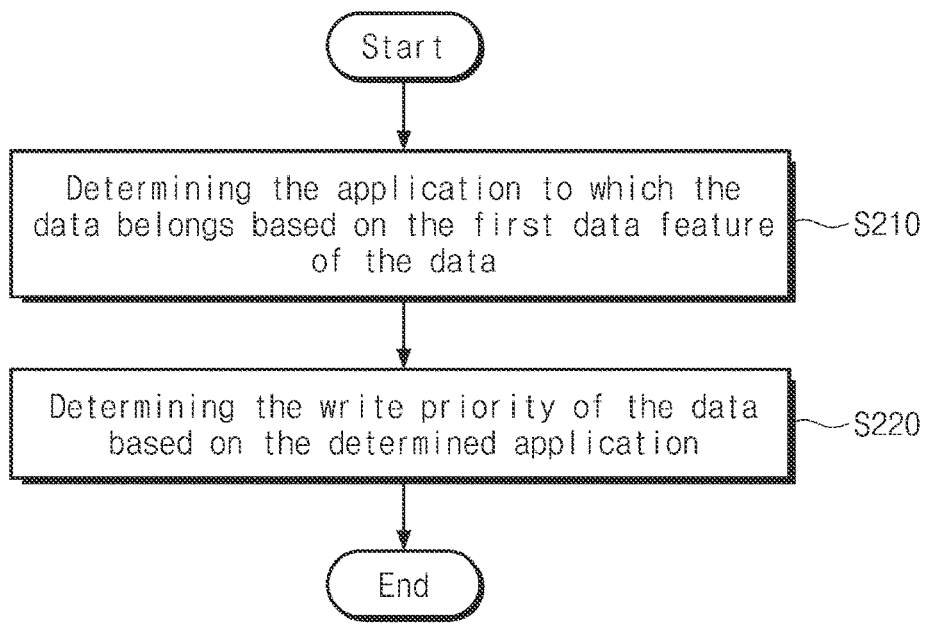
FIG. 2 is a flowchart illustrating a method of determining a write priority of data based on a first data feature of the data according to an exemplary embodiment of the present disclosure.

FIG. 2 is a flowchart illustrating the method of determining the write priority of data based on the first data feature of the data according to an exemplary embodiment of the present disclosure.

Referring to FIG. 2, in operation S210, the application to which the data belongs may be determined based on the first data feature of the data.

The application to which the data belongs may indicate the application that uses data, will use data, or generates data. For the description of the first data feature, reference is made to the description of the example in FIG. 1 and no more descriptions are provided here.

Typically, data generated and/or used by different applications may have different data features (e.g., the first data feature). Thus, it is feasible to determine the application to which the data belongs based on the first data feature of the data.

In one embodiment, the application to which the data belongs may be determined based on the first data feature of the data by using an application identification model, wherein the application identification model is a pre-trained prediction model. For example, the application identification model may be pre-trained to output the application corresponding to the input data based on the data feature (e.g., the first data feature) of the input data. According to the exemplary embodiment of the present disclosure, it is possible to identify the application to which the data belongs by the pre-trained application identification model; therefore, it is possible to accurately identify the application to which the data belongs.

Only as an example, the application identification model can be obtained through offline data collection, data feature selection, and model training.

In the offline data collection, the tracking information (that is, the information corresponding to the first data feature) under different applications may be collected according to the collection period (only as an example, 1 minute or 5 minutes) and the tracking information under different applications may be labeled according to the collection cycle.

In the data feature selection, data under different applications may be processed and, according to the labeled tracking information, feature engineering is used to analyze the feature relationships under different applications and the main features are selected for application classification. In an example, when the first application and the second application are distinguished, two features, e.g., the synchronous write ratio in one cycle and the frequency degree of hot and cold may be selected. However, the present disclosure is not limited to selecting the two features of the synchronous write ratio in one cycle and the frequency degree of hot and cold as the features for determining the application. For example, any other first data feature may be selected to identify the application. Alternatively, more features may need to be selected to distinguish more applications.

In model training, an application classification model based on machine learning (ML) may be built, data is processed according to the selected first data feature (only as an example, removing useless data, calculating, etc.), the parameters of the application identification model are iteratively adjusted until an error converges, and the test data is used to analyze the model identification accuracy to thereby determine the final application identification model.

In operation S220, the write priority of the data is determined based on the determined application.

In one embodiment, when the application to which the data belongs is an application that needs to write the data quickly, the write priority of the data is determined as a high write priority (for example, the second write priority) and the data is written to the second type of memory cell with a high write speed; and when the application to which the data belongs is an application that does not need to write data quickly, the write priority of the data is determined as a low write priority (for example, the first write priority) and the data is written to the first type of memory cell with a low write speed. Therefore, in the embodiment, the first type of memory cell and the second type of memory cell may be reasonably used by distinguishing the application to which the data belongs.

That is to say, according to the exemplary embodiment of the present disclosure, the type of memory cell to which data from the first application is written and the type of memory cell to which data from the second application is written may be different.

Alternatively, according to the exemplary embodiment of the present disclosure, when the same data is input under the first application and under the second application different from the first application, respectively, the result of writing the data from the first application and the result of writing the data from the second application may be different from each other. For example, the ratio between the amount of data from the first application that is written to the first type of memory cell (e.g., the memory cell corresponding to a low-speed NAND) and the amount of data from the first application that is written to the second type of memory cell (e.g., the memory cell corresponding to high-speed NAND) may be different from the ratio between the amount of data from the second application that is written to the first type of memory cell and the amount of data from the second application that is written to the second type of memory cell.

Step S220 will be described in more detail later in conjunction with the example of FIG. 3.

Figure 3:
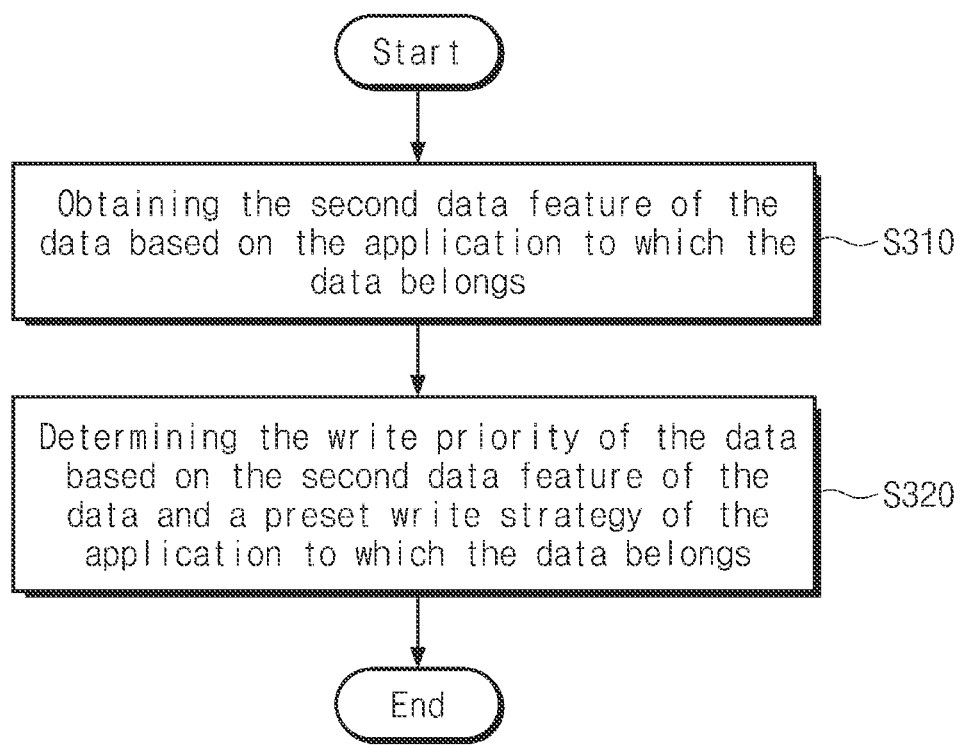
FIG. 3 is a flowchart illustrating a method of determining a write priority of data based on the determined application according to an exemplary embodiment of the present disclosure.

FIG. 3 is a flowchart illustrating the method of determining the write priority of data based on the determined application according to an exemplary embodiment of the present disclosure.

Referring to FIG. 3, in operation S310, the second data feature of the data is obtained based on the application to which the data belongs.

The second data feature of the data may be data related to the write strategy of the data. For example, the second data feature of the data may include one or more of the following features: a file type, a synchronous write ratio, time attribute information, a file system type, a synchronization identifier of a database file, a data synchronization identifier, a master device number, a slave device number, a logical block address sector number, a write data size, a process priority, a ratio of hot to cold data, an input and output size, and a data size. However, the second data feature of the data of the present disclosure is not limited to the above examples and may be one or more other features related to the writing of the data.

In operation S320, the write priority of the data is determined based on the second data feature of the data and a preset write strategy of the application to which the data belongs. The preset write strategy of the application may include a corresponding relationship between the second data feature of the data of the application and at least one write priority. The plurality of write priorities include the first write priority and the second write priority.

For example, the write priority corresponding to a first value of the second data feature under the preset write strategy of the first application may be the same as or different from the write priority corresponding to a second value of the second data feature under the preset write strategy of the first application. For another example, the write priority of the data may be determined based on the second data feature of the data through a pre-established look-up table corresponding to the preset write strategy.

In one embodiment, the preset write strategy may be obtained through an iterative testing.

More specifically, a plurality of write strategies may be formulated for the second data feature prior to the iterative testing. Afterwards, the write strategy with the best writing performance among the plurality of write strategies may be determined as the preset write strategy through the iterative testing.

In one example, assuming that the second data feature includes a first sub-data feature and a second sub-data feature, the first sub-data feature may have a first value or a second value and the second sub-data feature may have a third value or a fourth value. In the example, formulating the plurality of write strategies may include, but is not limited to, at least one of the following strategies: (1) a first strategy: writing data corresponding to the first sub-data feature with the first value and the second sub-data feature with the third value into the second type of memory cell and writing the remaining data into the first type of memory cell; and (2) a second strategy: writing data corresponding to the first sub-data feature with the second value and the second sub-data feature with the third value into the second type of memory cell and writing the remaining data into the first type of memory cell. Afterwards, the writing performance under the first strategy and the writing performance under the second strategy may be tested through the iterative testing, so that the strategy with the better writing performance among the first strategy and the second strategy is determined as the preset write strategy. For example, the better writing performance may indicate the second type of memory cell with a longer lifetime. The above examples are shown for ease of understanding only, and the present disclosure is not limited thereto.

That is to say, it is possible to perform data writing based on the optimal preset write strategy among the plurality of write strategies obtained through iterative testing; therefore, it is possible to improve the performance of the storage device. For example, the lifetime of the second type of memory cell under the preset write strategy may be higher than the lifetime of the second type of memory cell under other write strategies.

For example, an iterative testing may be a testing of several write strategies with respect to a single application. In one example, with respect to a single application, the features (i.e., the second data features, (e.g., only as an example, the ratio of input and output size (IO size), the ratio of synchronization (sync)) of the data of the application may be analyzed and then several write strategies may be formulated for iterative verification. The iterative testing will be described below in conjunction with examples, but the iterative testing of the present disclosure is not limited to the descriptions of the following examples. For example, the first strategy, the second strategy, and the features of the data used (e.g., the input and output size and the synchronization) in the following examples are all exemplary and the present disclosure is not limited thereto.

For example, in the iterative testing, when a primary weight is the input and output size and a secondary weight is the synchronization and the predetermined size (e.g., only as an example, 4 KB) of the input and output size accounts for the highest proportion, then the formulated strategy includes but is not limited to the following first strategy: data with the input and output size of 4 KB and containing a synchronization identifier is written into the second type of memory cell (e.g., the memory cell corresponding to a high-speed SLC NAND area) and the remaining data is written into the first type of memory cell (e.g., the memory cell corresponding to a low-speed NAND area).

For another example, in the iterative testing, when the primary weight is the synchronization and the secondary weight is the input and output size, the strategy includes but is not limited to the following second strategy: data with the synchronization identifier and the input and output size being a predetermined size (e.g., only as an example, 4 KB) is written into the second type of memory cell (e.g., the memory cell corresponding to the high-speed SLC NAND area) and the remaining data is written into the first type of memory cell (e.g., the memory cell corresponding to the low-speed NAND area).

After each strategy (e.g., the first strategy and the second strategy) is tested a certain number of times, one of the first strategy and the second strategy may be determined as the preset write strategy of the application according to the performance (e.g., average performance) of the storage device under each strategy. The preset write strategy may finally send the information based on whether the data is to be written into the second type of memory cell to the storage device through an interface provided by the storage device (e.g., a UFS device). In one example, the iterative testing may be a dynamic testing.

That is to say, according to the method of storing data of the present disclosure, the write priority of data may be determined based on the application to which the data belongs and the second data feature. Therefore, in the embodiment, the first type of memory cell and the second type of memory cell may be more reasonably used based on the application to which the data belongs and the second data feature. More specifically, even when the applications to which the data belongs are the same, the data under the same application may have different requirements for the write speed. Thus, it is possible to use the second data feature with respect to different applications to further determine the write priority of data and the use of the first type of memory cell and the second type of memory cell can be optimized, thereby improving the writing performance and service life.

Figure 4:
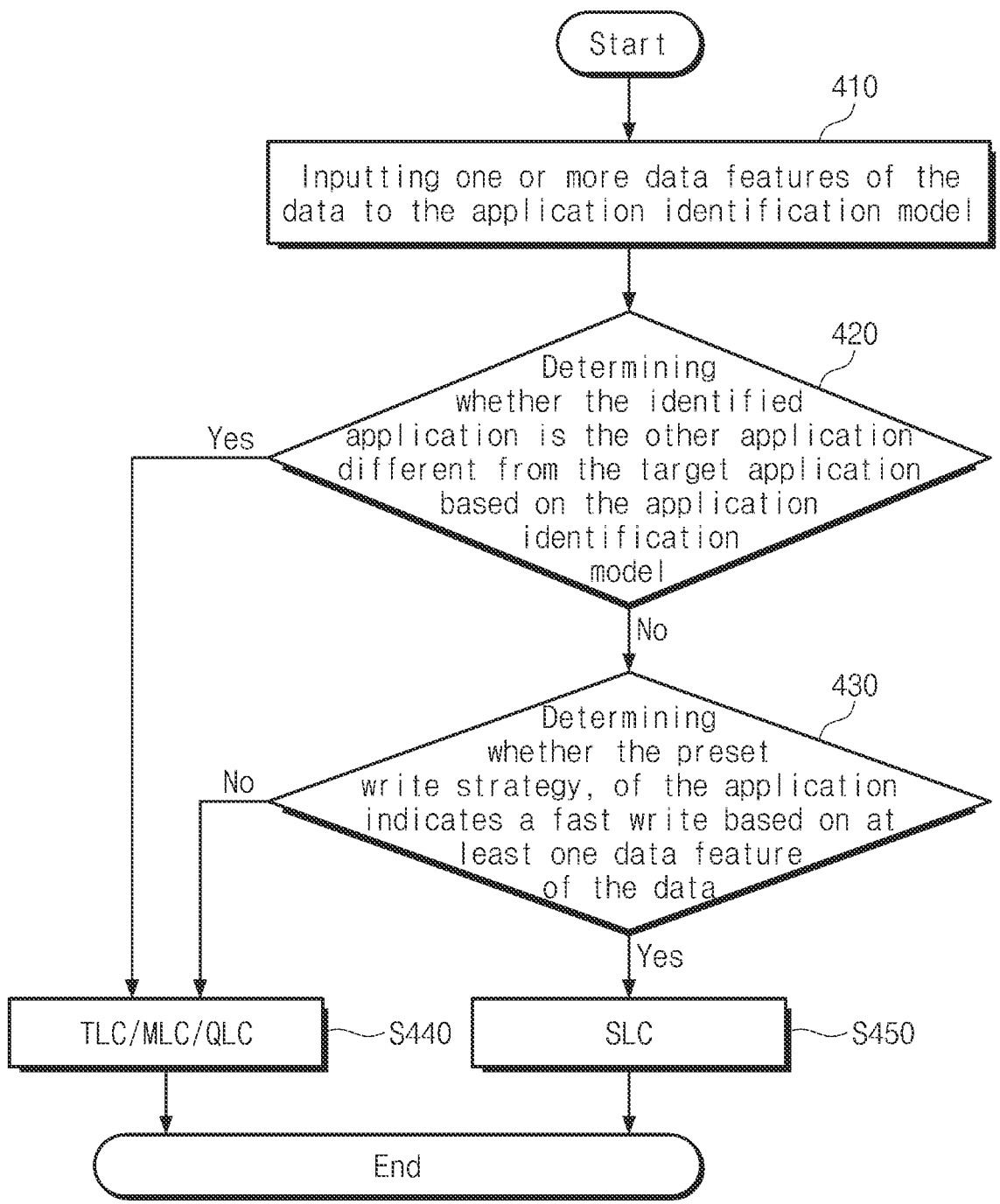
FIG. 4 is a flowchart illustrating the method of storing data according to an exemplary embodiment of the present disclosure.

FIG. 4 is a flowchart illustrating the method of storing data according to an exemplary embodiment of the present disclosure.

Referring to FIG. 4, in operation S410, one or more data features of the data may be input to the application identification model. The application identification model may be pre-trained to output the application corresponding to the input data based on the data feature of the input data.

However, due to the wide variety of applications and the fact that the data used to train the application identification model cannot include data from all the applications, the application identification model may be trained to identify the target application corresponding to the training data. For example, an application identification model may be trained to identify the first application and the second application. In this case, when the application identification model is used to identify the data of a third application and the data of a fourth application, the application identification model may identify the third application and the fourth application as other applications different from the target applications (e.g., the first application and second application).

In operation S420, whether the identified application is the other application different from the target application may be determined based on the application identification model. More specifically, the application to which the data belongs may be identified based on the application identification model and whether the application to which the data belongs is the other application different from the target application may be determined. When it is determined in operation S420 that the application to which the data belongs is the other application, the data may be stored in the first type of memory cell corresponding to the first write priority in operation S440. In the example of FIG. 4, the first type of memory cell may be one or more of MLC, TLC and QLC.

When it is determined in operation S420 that the application to which the data belongs is not the other application (i.e., the application to which the data belongs is the target application), whether the preset write strategy of the application indicates a fast write may be determined based on at least one data feature of the data in operation S430. The preset write strategy of the application may indicate write strategies corresponding to different values of the data feature. For example, the preset write strategy may include writing data into the first type of memory cell corresponding to the first write priority or writing data into the second type of memory cell corresponding to the second write priority according to the value of the data feature.

When determining the preset write strategy of the application does not indicate the fast write in operation S430, the data may be stored in the first type of memory cell corresponding to the first write priority in operation S440.

When determining the preset write strategy of the application indicates the fast write in operation S430, the data may be stored in the second type of memory cell corresponding to the second write priority in operation S450. In the example of FIG. 4, the second type of memory cell may be SLC.

Although in the example of FIG. 4, the first type of memory cell may be one or more of MLC, TLC and QLC and the second type of memory cell may be SLC, the present disclosure is not limited to the above examples. For example, the first type of memory cell and the second type of memory cell may be two of SLC, MLC, TLC and QLC and the write speed of the second type of memory cell may be higher than that of the first type of memory cell.

Figure 5:
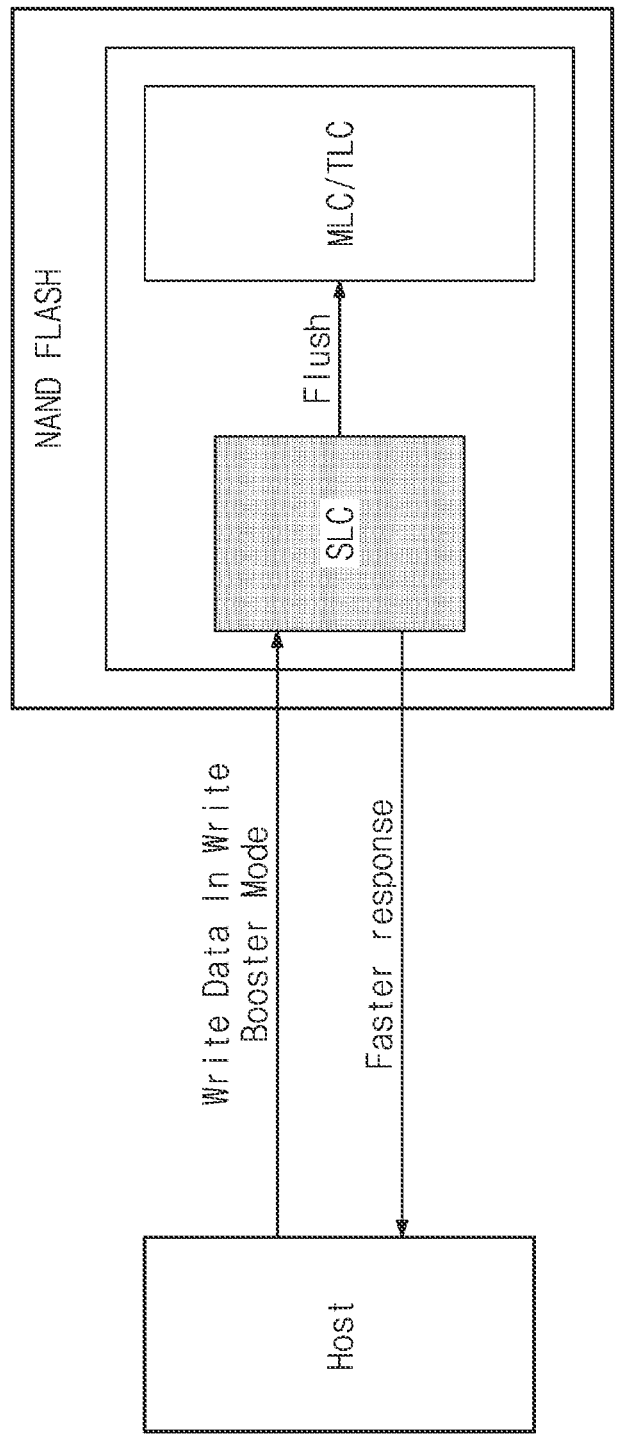
FIG. 5 is a flowchart illustrating a Write Booster function according to the related art.

FIG. 5 is a flowchart illustrating the Write Booster function according to the related art.

Write Booster is an important technology of the storage devices such as Universal Flash Storage (UFS) (e.g., NAND flash storage). When the Write Booster function is turned on, data of the host is written into SLC to increase the write speed. However, the capacity of SLC is limited and then the data in SLC will be written into low-speed NAND flash storage such as TLC/MLC or QLC. Therefore, the Write Booster plays a crucial role in the write request from the host with high latency requirements.

When SLC capacity is fixed, if the Write Booster function is turned on, the data is not distinguished but all data on the host end is written into SLC. The amount of data written into SLC will greatly increase, causing the writing performance to decrease, the lifetime of the device to quickly exhaust, and the user experience to become worse.

More specifically, the existing Write Booster may implement writing data into SLC through three ways: 1. the Write Booster switch is turned on and all data is written into SLC; 2. the Write Booster is turned on in different time periods and all the data in the opening period is written into SLC; and 3. when the data amount is large, all the data is written into SLC. When the continuously written data is larger than the size of the SLC space, it is necessary to write the data into the non-SLC storage space. At this time, the continuous write speed may become the real write speed of TLC/QLC NAND such that there is a disconnected decline and the user experience degrades.

As described above with reference to any one of FIGS. 1 to 5, according to the methods of storing data of the exemplary embodiments of the present disclosure, the data may be stored in the memory cell corresponding to the write priority of data according to the write priority of data (e.g., the first type memory cell or the second type of memory cell).

In the case where the Write Booster function is turned on, it is possible to store the data in the memory cell corresponding to the write priority of data according to the write priority of data, rather than writing all of the data to the second type of memory cell (e.g., SLC); therefore, the amount of data written to the second type of memory cell may be reduced, thereby extending the lifetime of the second type of memory cell and improving the writing performance.

Figure 6:
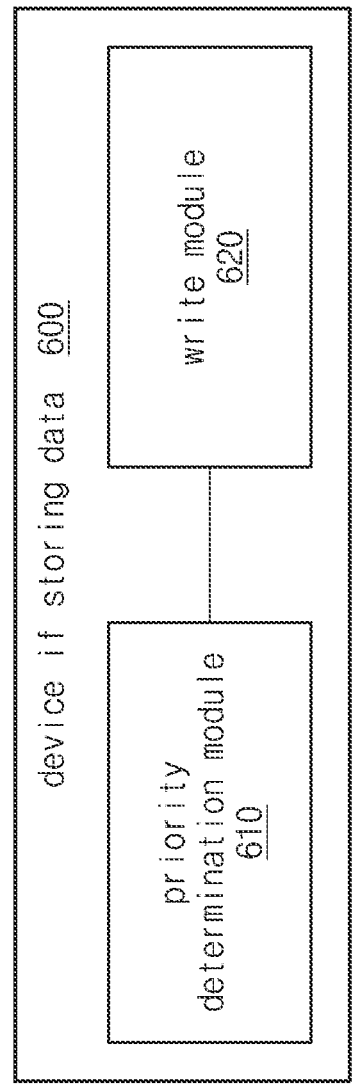
FIG. 6 is a block diagram illustrating a device of storing data according to an exemplary embodiment of the present disclosure.

FIG. 6 is a block diagram illustrating the device of storing data according to an exemplary embodiment of the present disclosure.

Referring to FIG. 6, a device 600 of storing data according to an exemplary embodiment of the present disclosure may include a priority determination module 610 and a write module 620.

The priority determination module 610 may determine the write priority of data in response to a write request for data by the host. For example, the priority determination module 610 may determine the write priority of the data according to the method described with reference to at least one of FIGS. 1 to 4.

In one example, the priority determination module 610 may include an obtaining unit (not shown) and a determination unit (not shown). The determination unit may perform the method described with reference to at least one of FIGS. 1 to 4 to determine the priority of the data. The obtaining unit may obtain the data (e.g., the first data feature of the data) required by the determination unit to determine the priority of data.

The write module 620 may write the data into the first type of memory cell in response to the write priority of the data being the first write priority. In addition, the write module 620 may write the data into the second type of memory cell in response to the write priority of the data being the second write priority. The second write priority is higher than the first write priority, and the write speed of the second type of memory cell is higher than the write speed of the first type of memory cell. That is to say, the write module 620 may perform writing of the data. For example, the write module 620 may perform the writing of data according to the method described with reference to at least one of FIGS. 1 to 4.

Figure 7:
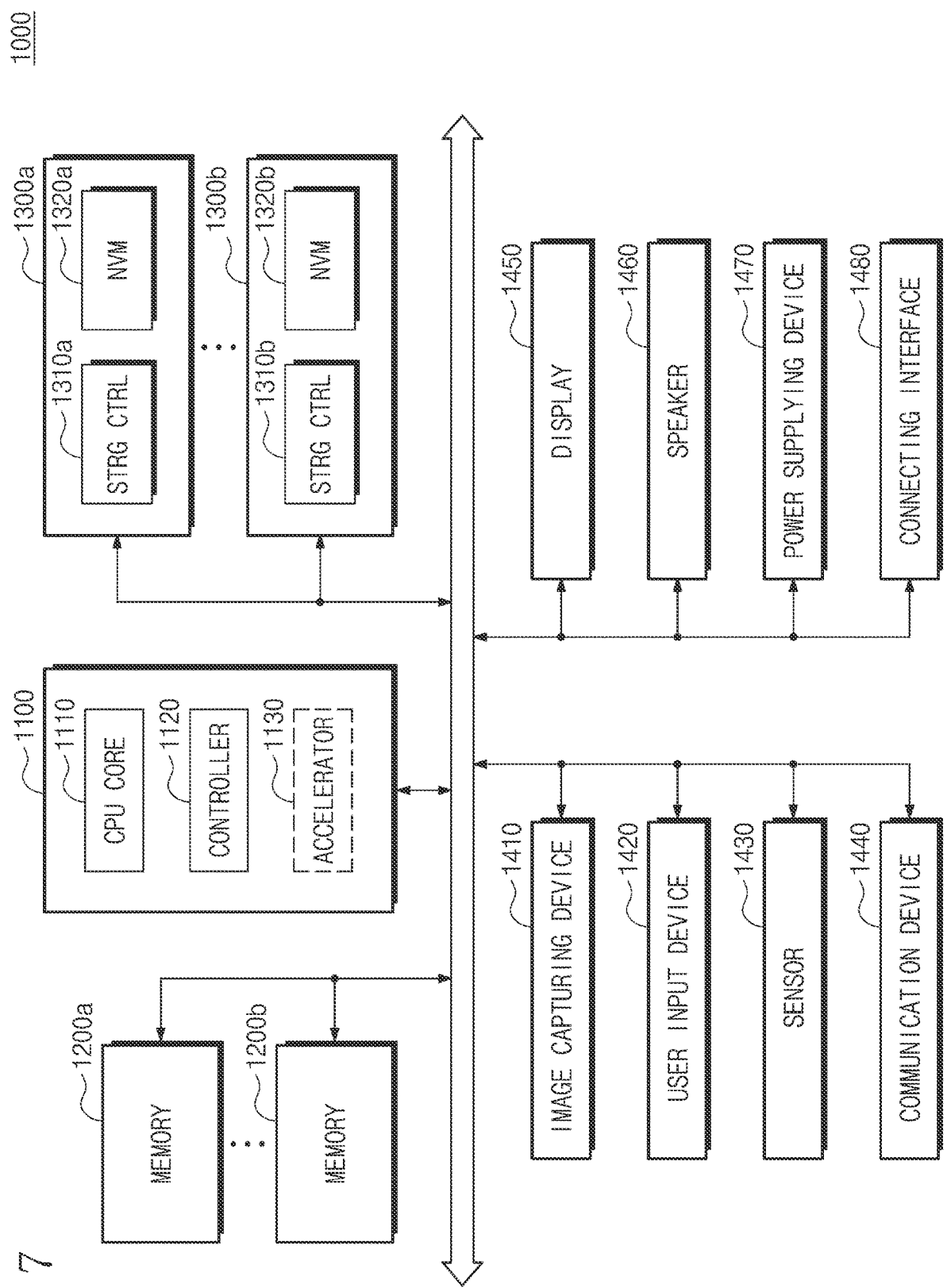
FIG. 7 is a schematic diagram of a system to which a storage device is applied according to an embodiment.

FIG. 7 is a schematic diagram of a system 1000 to which a storage device is applied, according to an embodiment. The system 1000 (such as an electronic system) of FIG. 7 may basically be a mobile system, such as a portable communication terminal (e.g., a mobile phone), a smartphone, a tablet personal computer (PC), a wearable device, a healthcare device, or an Internet of things (JOT) device. However, the system 1000 of FIG. 7 is not necessarily limited to the mobile system and may be a PC, a laptop computer, a server, a media player, or an automotive device (e.g., a navigation device).

Referring to FIG. 7, the system 1000 may include a main processor 1100, memories (e.g., 1200a and 1200b), and storage devices (e.g., 1300a and 1300b). In addition, the system 1000 may include at least one of an image capturing device 1410, a user input device 1420, a sensor 1430, a communication device 1440, a display 1450, a speaker 1460, a power supplying device 1470, and a connecting interface 1480.

In some embodiments, memories (e.g., 1200A and 1200*b*) and/or storage devices (e.g., 1300*a* and 1300*b*) may correspond to the storage device or the device of storing data according to the exemplary embodiment of the present disclosure. For example, memories (e.g., 1200*a* and 1200*b*) and/or storage devices (e.g., 1300*a* and 1300*b*) may store data according to the method of storing data described with reference to at least one of FIGS. 1 to 5.

The main processor 1100 may control all operations of the system 1000 and, more specifically, may control operations of other components included in the system 1000. The main processor 1100 may be implemented as a general-purpose processor, a dedicated processor, or an application processor.

The main processor 1100 may include at least one CPU core 1110 and further include a controller 1120 configured to control the memories 1200*a* and 1200*b* and/or the storage devices 1300*a* and 1300*b*. In some embodiments, the main processor 1100 may further include an accelerator 1130, which is a dedicated circuit for a high-speed data operation, such as an artificial intelligence (AI) data operation. The accelerator 1130 may include a graphics processing unit (GPU), a neural processing unit (NPU) and/or a data processing unit (DPU) and be implemented as a chip that is physically separate from the other components of the main processor 1100.

The memories 1200*a* and 1200*b* may be used as main memory devices of the system 1000. Although each of the memories 1200*a* and 1200*b* may include a volatile memory, such as static random access memory (SRAM) and/or dynamic RAM (DRAM), each of the memories 1200*a* and 1200*b* may include non-volatile memory, such as a flash memory, a phase-change RAM (PRAM) and/or a resistive RAM (RRAM) etc. The memories 1200*a* and 1200*b* may be implemented in the same package as the main processor 1100.

The storage devices 1300*a* and 1300*b* may serve as non-volatile storage devices, configured to store data regardless of whether power is supplied thereto, and have larger storage capacities than the memories 1200*a* and 1200*b*. The storage devices 1300*a* and 1300*b* may respectively include storage controllers (STRG CTRL) 1310*a* and 1310*b* and NVM (Non-Volatile Memory)s 1320*a* and 1320*b* configured to store data via the control of the storage controllers 1310*a* and 1310*b*. Although the NVMs 1320*a* and 1320*b* may include flash memories having a two-dimensional (2D) structure or a three-dimensional (3D) V-NAND structure, the NVMs 1320*a* and 1320*b* may include other types of NVMs, such as PRAM and/or RRAM.

The storage devices 1300*a* and 1300*b* may be physically separated from the main processor 1100 and included in the system 1000 or implemented in the same package as the main processor 1100. In addition, the storage devices 1300*a* and 1300*b* may have types of solid-state devices (SSDs) or memory cards and be removably combined with other components of the system 1000 through an interface, such as the connecting interface 1480 that will be described below. The storage devices 1300*a* and 1300*b* may be devices to which a standard protocol, such as a universal flash storage (UFS), an embedded multi-media card (eMMC), or a non-volatile memory express (NVMe), is applied, without being limited thereto.

The image capturing device 1410 may capture still images or moving images. The image capturing device 1410 may include a camera, a camcorder, and/or a webcam.

The user input device 1420 may receive various types of data input by a user of the system 1000 and include a touch pad, a keypad, a keyboard, a mouse, and/or a microphone.

The sensor 1430 may detect various types of physical quantities, which may be obtained from outside of the system 1000, and convert the detected physical quantities into electric signals. The sensor 1430 may include a temperature sensor, a pressure sensor, an illuminance sensor, a position sensor, an acceleration sensor, a biosensor, and/or a gyroscope sensor.

The communication device 1440 may transmit and receive signals between other devices outside the system 1000 according to various communication protocols. The communication device 1440 may include an antenna, a transceiver, and/or a modem.

The display 1450 and the speaker 1460 may serve as output devices configured to respectively output visual information and auditory information to the user of the system 1000.

The power supplying device 1470 may appropriately convert power supplied from a battery (not shown) embedded in the system 1000 and/or an external power source and supply the converted power to each of components of the system 1000.

The connecting interface 1480 may provide connection between the system 1000 and an external device, which is connected to the system 1000 and capable of transmitting and receiving data to and from the system 1000. The connecting interface 1480 may be implemented by using various interface schemes, such as an advanced technology attachment (ATA), a serial ATA (SATA), an external SATA (e-SATA), a small computer small interface (SCSI), a serial attached SCSI (SAS), a peripheral component interconnection (PCI), a PCI express (PCIe), an NVMe, an IEEE 1394, a universal serial bus (USB) interface, a secure digital (SD) card interface, a multi-media card (MMC) interface, an eMMC interface, a UFS interface, an embedded UFS (eUFS) interface, and a compact flash (CF) card interface.

Figure 8:
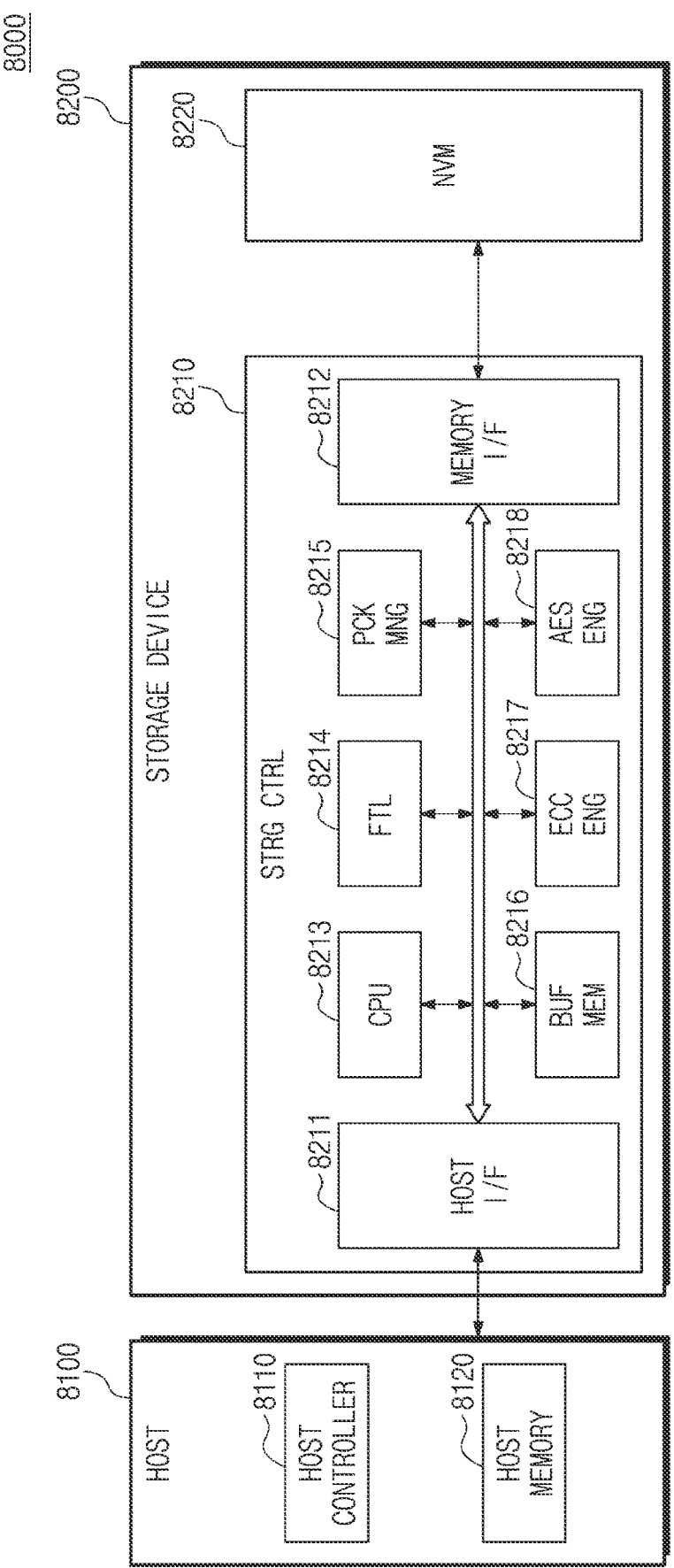
FIG. 8 is a block diagram of a host storage system according to an exemplary embodiment.

FIG. 8 is a block diagram of a host storage system 8000 according to an exemplary embodiment.

The host storage system 8000 may include a host 8100 and a storage device 8200. In addition, the storage device 8200 may include a memory controller 8210 and a NVM 8220. According to an exemplary embodiment of the present disclosure, the host 8100 may include a host controller 8110 and a host memory 8120. The host memory 8120 may be used as a buffer memory configured to temporarily store data to be transmitted to or received from the storage device 8200.

In some embodiments, the host 8100 and/or the storage device 8200 may correspond to the device of storing data according to the exemplary embodiment of the present disclosure. For example, the storage device 8200 may include the first type of memory cell and the second type of memory cell.

The storage device 8200 may include a storage medium configured to store data in response to a request from the host 8100. As an example, the storage device 8200 may include at least one of an SSD, an embedded memory, and a removable external memory. When the storage device 8200 is an SSD, the storage device 8200 may be an NVMe compliant device. When the storage device 8200 is an embedded memory or an external memory, the storage device 8200 may be a device conforming to the UFS standard or eMMC standard. Both the host 8100 and the storage device 8200 can generate a packet and send the packet according to the adopted standard protocol.

When the NVM 8220 of the storage device 8200 includes a flash memory, the flash memory may include a 2D NAND storage array or a 3D (or vertical) NAND (VNAND) storage array. As another example, the storage device 8200 may include various other kinds of NVMs. For example, the storage device 8200 may include magnetic random access memory (MRAM), spin transfer torque MRAM, conductive bridge RAM (CBRAM), ferroelectric RAM (FRAM), PRAM, RRAM, and various other types of memory.

According to an embodiment, the host controller 8110 and the host memory 8120 may be implemented as separate semiconductor chips. Alternatively, in some embodiments, the host controller 8110 and the host memory 8120 may be integrated in the same semiconductor chip. As an example, the host controller 8110 may be any one of a plurality of modules included in an application processor (AP). The AP can be implemented as a system on chip (SOC). In addition, the host memory 8120 may be an embedded memory included in the AP or a memory module external to the AP.

The host controller 8110 may manage an operation of storing data (e.g., writing data) of the buffer area of the host memory 8120 in the NVM 8220 or an operation of storing data (e.g., reading data) of the NVM 8220 in the buffer area.

The memory controller 8210 may include a host interface 8211, a memory interface 8212, and a CPU 8213. In addition, the memory controller 8210 may also include a flash conversion layer (FTL) 8214, a packet manager 8215, a buffer memory 8216, an error correction code (ECC) engine 8217, and an advanced encryption standard (AES) engine 8218. The memory controller 8210 may further include a working memory (not shown) in which FTL 8124 is loaded. The CPU 8213 may execute the FTL 8214 to control data writing and reading operations on the NVM 8220.

The host interface 8211 may send and receive packets to and from the host 8100. The packet sent from the host 8100 to the host interface 8211 may include a command or data to be written to the NVM 8220. The packet sent from the host interface 8211 to the host 8100 may include a response to the command or data read from the NVM 8220. The memory interface 8212 may send data to be written to the NVM 8220 or receive data read from the NVM 8220. The memory interface 8212 may be configured to conform to a standard protocol such as toggle or open NAND flash interface (ONFI).

The FTL 8214 can perform various functions, such as an address mapping operation, a wear balancing operation, and a garbage collection operation. The address mapping operation can be an operation of converting a logical address received from the host 8100 into a physical address used to store data in the NVM 8220. The wear balancing operation can be a technology of preventing excessive degradation of a specific block by allowing uniform use of NVM 8220 blocks. As an example, the wear balancing operation can be realized by using firmware technology to balance the erase count of physical blocks. The garbage collection operation can be a technology to ensure an available capacity in the NVM 8220 by erasing the existing blocks after copying the valid data of the existing blocks to the new blocks.

The packet manager 8215 may generate packets according to a protocol that comports with the interface of the host 8100 or parse various types of information from packets received from the host 8100. In addition, the buffer memory 8216 may temporarily store data to be written to or read from the NVM 8220. Although the buffer memory 8216 may be a component included in the memory controller 8210, the buffer memory 8216 may be external to the memory controller 8210.

ECC engine 8217 can perform error detection and correction operations on the read data read from the NVM 8220. More specifically, ECC engine 8217 can generate parity bits for the write data to be written to the NVM 8220 and the generated parity bits can be stored in the NVM 8220 together with the write data. During reading data from the NVM 8220, ECC engine 8217 can use read data and the parity bit read from the NVM 8220 to correct an error in the read data and output the read data after error correction.

The AES engine 8218 may perform at least one of an encryption operation and a decryption operation on the data input to the memory controller 8210 by using a symmetric key algorithm.

Figure 9:
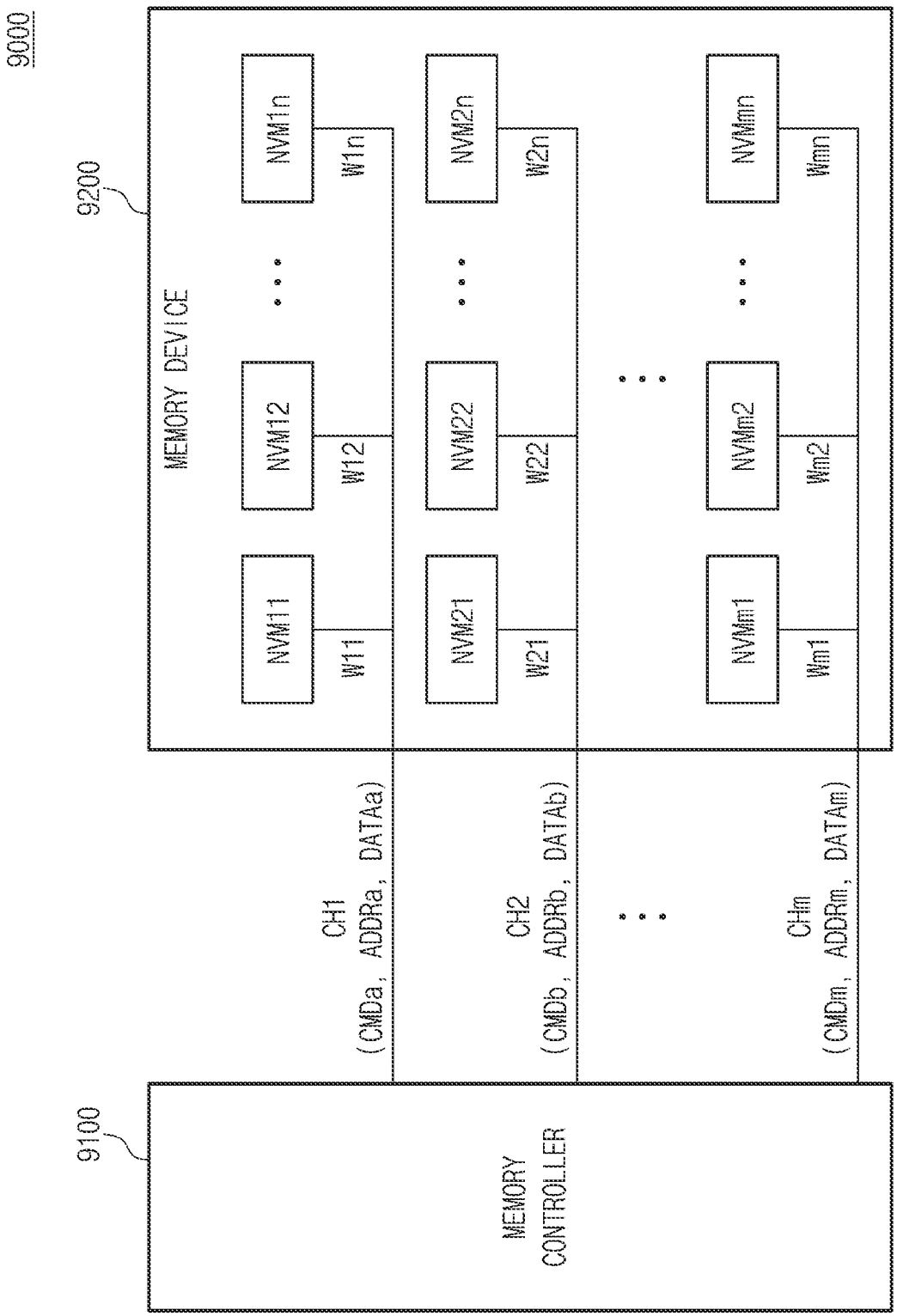
FIG. 9 is a block diagram of a storage system according to an embodiment of the present disclosure.

FIG. 9 is a block diagram of a storage system 9000 according to an embodiment of the present disclosure.

Referring to FIG. 9, the storage system 9000 may include a storage device 9200 and a memory controller 9100. The storage system 9000 may support multiple channels CH1 to CHm, and the storage device 9200 may be connected to the memory controller 9100 through the multiple channels CH1 to CHm. For example, the storage system 9000 may be implemented as a storage device such as an SSD.

In some embodiments, the storage system 9000 may correspond to the device of storing data according to the exemplary embodiment of the present disclosure. For example, the storage device 9200 may include the first type of memory cell and the second type of memory cell and the memory controller 9100 may store data according to the method described with reference to at least one of FIGS. 1 to 5.

The storage device 9200 may include a plurality of NVM devices NVM11 to NVMmn. Each of the NVM devices NVM11 to NVMmn can be connected to one of the plurality of channels CH1 to CHm through its corresponding way. For example, NVM devices NVM11 to NVM1$n$ may be connected to a first channel CH1 through paths W11 to W1$n$ and NVM devices NVM21 to NVM2$n$ may be connected to a second channel CH2 through paths W21 to W2$n$. In an exemplary embodiment, each of the NVM devices NVM11 to NVM1$n$ may be implemented as any storage element, which may operate according to a separate command from the memory controller 9100. For example, each of the NVM devices NVM11 to NVM1$n$ may be implemented as a chip or die, but the present disclosure is not limited thereto.

The memory controller 9100 may send and receive signals to and from the storage device 9200 through the plurality of channels CH1 to CHm. For example, the memory controller 9100 may send commands CMDa to CMDm, addresses ADDRa to ADDRm, and data DATAa to DATAm to the storage device 9200 through the channels CH1 to CHm or receive data DATA DATAa to DATAm from the storage device 9200.

The memory controller 9100 may select one from the NVM devices NVM11 to NVMmn connected to each of the channels CH1 to CHm by using the corresponding one of the channels CH1 to CHm and send and receive signals to and from the selected NVM device. For example, the memory controller 9100 may select the NVM device NVM11 from the NVM devices NVM11 to NVM1$n$ connected to the first channel CH1. The memory controller 9100 can send the command CMDa, address ADDRa, and data DATAa to the selected NVM device NVM11 through the first channel CH1 or receive data DATAa from the selected NVM device NVM11.

The memory controller 9100 may send and receive signals to and from the storage device 9200 in parallel through channels different from each other. For example, the memory controller 9100 may send the command CMDa to the storage device 9200 through the first channel CH1 and the command CMDb to the storage device 9200 through the second channel CH2. For example, the memory controller 9100 may receive data DATAa from the storage device 9200 through the first channel CH1 and the data DATAb from the storage device 9200 through the second channel CH2.

The memory controller 9100 may control all operations of the storage device 9200. The memory controller 9100 may send signals to channels CH1 to CHm and control each of the NVM devices NVM11 to NVMmn connected to the channels CH1 to CHm. For example, the memory controller 9100 may send the command CMDa and the address ADDRa to the first channel CH1 and control one selected from the NVM devices NVM11 to NVM 1n.

Each of the NVM devices NVM11 to NVMmn can be operated via the control of the memory controller 9100. For example, the NVM device NVM11 may program the data DATAa based on the command CMDa, the address ADDRa, and the data DATAa provided to the first channel CH1. For example, the NVM device NVM21 may read the data DATAb based on the command CMDb and the address ADDb provided to the second channel CH2 and send the read data DATAb to the memory controller 9100.

Although FIG. 9 shows an example in which the storage device 9200 communicates with the memory controller 9100 through M channels and includes N NVM devices corresponding to each channel, the number of channels and the number of NVM devices connected to one channel can be changed.

Figure 10:
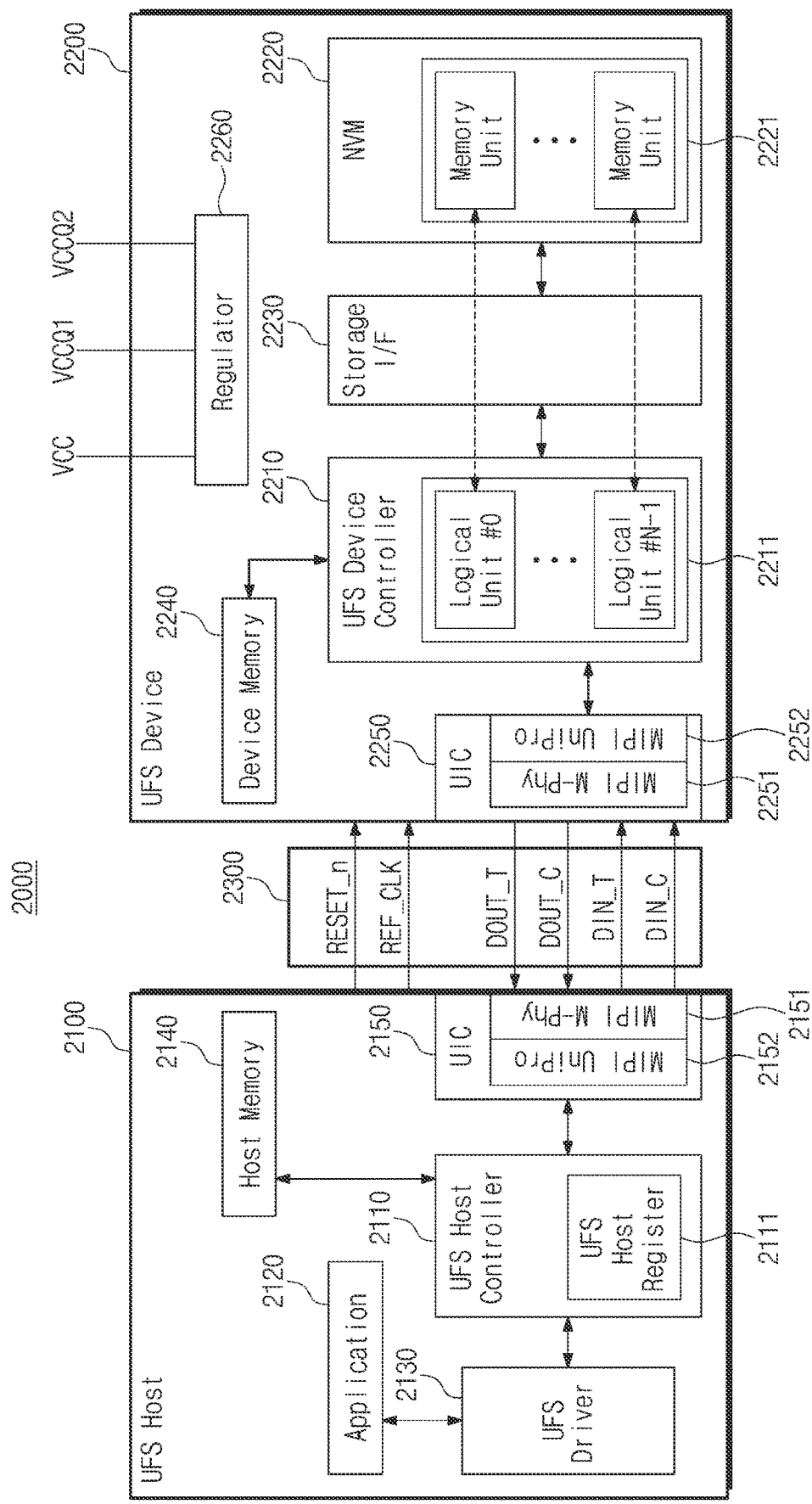
FIG. 10 is a block diagram of a UFS system according to an embodiment.

FIG. 10 is a diagram of a UFS system 2000 according to an embodiment.

The UFS system 2000 may be a system conforming to a UFS standard announced by the Joint Electron Device Engineering Council (JEDEC) and include a UFS host 2100, a UFS device 2200, and a UFS interface 2300. The above description of the system 1000 of FIG. 7 may also be applied to the UFS system 2000 of FIG. 10 within a range that does not conflict with the following description of FIG. 10.

In some embodiments, the UFS host 2100 and/or the UFS device 2200 may correspond to the device of storing data according to the exemplary embodiment of the present disclosure. For example, the UFS device 2000 may include the first type of memory cell and the second type of memory cell.

Referring to FIG. 10, the UFS host 2100 may be connected to the UFS device 2200 through the UFS interface 2300. When the main processor 1100 of FIG. 10 is an AP, the UFS host 2100 may be implemented as a portion of the AP. The UFS host controller 2110 and the host memory 2140 may respectively correspond to the controller 1120 of the main processor 1100 and the memories 1200a and 1200b of FIG. 7. The UFS device 2200 may correspond to the storage devices 1300a and 1300b of FIG. 7, and a UFS device controller 2210 and an NVM 2220 may respectively correspond to the storage controllers 1310a and 1310b and the NVMs 1320a and 1320b of FIG. 7.

The UFS host 2100 may include a UFS host controller 2110, an application 2120, a UFS driver 2130, a host memory 2140, and a UFS interconnect (UIC) layer 2150. The UFS device 2200 may include the UFS device controller 2210, the NVM 2220, a storage interface 2230, a device memory 2240, a UIC layer 2250, and a regulator 2260. The NVM 2220 may include a plurality of memory units 2221. Although each of the memory units 2221 may include a V-NAND flash memory having a 2D structure or a 3D structure, each of the memory units 2221 may include another kind of NVM, such as PRAM and/or RRAM. The UFS device controller 2210 may be connected to the NVM 2220 through the storage interface 2230. The storage interface 2230 may be configured to comply with a standard protocol, such as Toggle or ONFI.

The application 2120 may refer to a program that wants to communicate with the UFS device 2200 to use functions of the UFS device 2200. The application 2120 may transmit input-output requests (IORs) to the UFS driver 2130 for input/output (I/O) operations on the UFS device 2200. The IORs may refer to a data read request, a data storage (or write) request, and/or a data erase (or discard) request, without being limited thereto.

The UFS driver 2130 may manage the UFS host controller 2110 through a UFS-host controller interface (UFS-HCI). The UFS driver 2130 may convert the IOR generated by the application 2120 into a UFS command defined by the UFS standard and transmit the UFS command to the UFS host controller 2110. One IOR may be converted into a plurality of UFS commands. Although the UFS command may basically be defined by an SCSI standard, the UFS command may be a command dedicated to the UFS standard.

The UFS host controller 2110 may transmit the UFS command converted by the UFS driver 2130 to the UIC layer 2250 of the UFS device 2200 through the UIC layer 2150 and the UFS interface 2300. During the transmission of the UFS command, a UFS host register 2111 of the UFS host controller 2110 may serve as a command queue (CQ).

The UIC layer 2150 on the side of the UFS host 2100 may include a mobile industry processor interface (MIPI) M-PHY 2151 and an MIPI UniPro 2152, and the UIC layer 2250 on the side of the UFS device 2200 may also include an MIPI M-PHY 2251 and an MIPI UniPro 2252.

The UFS interface 2300 may include a line configured to transmit a reference clock signal REF_CLK, a line configured to transmit a hardware reset signal RESET_n for the UFS device 2200, a pair of lines configured to transmit a pair of differential input signals DIN_t and DIN_c, and a pair of lines configured to transmit a pair of differential output signals DOUT_t and DOUT c.

A frequency of the reference clock signal REF_CLK provided from the UFS host 2100 to the UFS device 2200 may be one of 19.2 MHz, 26 MHz, 38.4 MHz, and 52 MHz, without being limited thereto. The UFS host 2100 may change the frequency of the reference clock signal REF_CLK during the operation, that is, during data transmission/receiving operations between the UFS host 2100 and the UFS device 2200. The UFS device 2200 may generate cock signals having various frequencies from the reference clock signal REF_CLK provided from the UFS host 2100, by using a phase-locked loop (PLL). Also, the UFS host 2100 may set a data rate between the UFS host 2100 and the UFS device 2200 by using the frequency of the reference clock signal REF_CLK. That is, the data rate may be determined depending on the frequency of the reference clock signal REF_CLK.

The UFS interface 2300 may support a plurality of channels, each of which may be implemented as a pair of differential lines. For example, the UFS interface 2300 may include at least one receiving channel and at least one transmission channel. In FIG. 10, a pair of lines configured to transmit a pair of differential input signals DIN_T and DIN_C may constitute a receiving channel and a pair of lines configured to transmit a pair of differential output signals DOUT_T and DOUT_C may constitute a transmission channel. Although one transmission channel and one receiving channel are illustrated in FIG. 10, the number of transmission channels and the number of receiving channels may be changed.

The receiving channel and the transmission channel may transmit data based on a serial communication scheme. Full-duplex communications between the UFS host 2100 and the UFS device 2200 may be enabled due to a structure in which the receiving channel is separated from the transmission channel. That is, while receiving data from the UFS host 2100 through the receiving channel, the UFS device 2200 may transmit data to the UFS host 2100 through the transmission channel. In addition, control data (e.g., a command) from the UFS host 2100 to the UFS device 2200 and user data to be stored in or read from the NVM 2220 of the UFS device 2200 by the UFS host 2100 may be transmitted through the same channel. Accordingly, between the UFS host 2100 and the UFS device 2200, there may be no need to further provide a separate channel for data transmission in addition to a pair of receiving channels and a pair of transmission channels.

The UFS device controller 2210 of the UFS device 2200 may control all operations of the UFS device 2200. The UFS device controller 2210 may manage the NVM 2220 by using a logical unit (LU) 2211, which is a logical data memory cell. The number of LUs 2211 may be 8, without being limited thereto. The UFS device controller 2210 may include an FTL and convert a logical data address (e.g., a logical block address (LBA)) received from the UFS host 2100 into a physical data address (e.g., a physical block address (PBA)) by using address mapping information of the FTL. A logical block configured to store user data in the UFS system 2000 may have a size within a predetermined range. For example, a minimum size of the logical block may be set to 4 Kbyte.

When a command from the UFS host 2100 is applied through the UIC layer 2250 to the UFS device 2200, the UFS device controller 2210 may perform an operation in response to the command and transmit a completion response to the UFS host 2100 when the operation is completed.

As an example, when the UFS host 2100 intends to store user data in the UFS device 2200, the UFS host 2100 may transmit a data storage command to the UFS device 2200. When a response (a 'ready-to-transfer' response) indicating that the UFS host 2100 is ready to receive user data (ready-to-transfer) is received from the UFS device 2200, the UFS host 2100 may transmit the user data to the UFS device 2200. The UFS device controller 2210 may temporarily store the received user data in the device memory 2240 and store the user data, which is temporarily stored in the device memory 2240, at a selected position of the NVM 2220 based on the address mapping information of the FTL.

As another example, when the UFS host 2100 intends to read the user data stored in the UFS device 2200, the UFS host 2100 may transmit a data read command to the UFS device 2200. The UFS device controller 2210, which has received the command, may read the user data from the NVM 2220 based on the data read command and temporarily store the read user data in the device memory 2240. During the read operation, the UFS device controller 2210 may detect and correct an error in the read user data by using an ECC engine (not shown) embedded therein. More specifically, the ECC engine may generate parity bits for write data to be written to the NVM 2220 and the generated parity bits may be stored in the NVM 2220 along with the write data. During the reading of data from the NVM 2220, the ECC engine may correct an error in the read data by using the parity bits read from the NVM 2220 along with the read data and output the error-corrected read data.

In addition, the UFS device controller 2210 may transmit the user data, which is temporarily stored in the device memory 2240, to the UFS host 2100. In addition, the UFS device controller 2210 may further include an AES engine (not shown). The AES engine may perform at least of an encryption operation and a decryption operation on data transmitted to the UFS device controller 2210 by using a symmetric-key algorithm.

The UFS host 2100 may sequentially store commands, which are to be transmitted to the UFS device 2200, in the UFS host register 2111, which may serve as a common queue, and sequentially transmit the commands to the UFS device 2200. In this case, even while a previously transmitted command is still being processed by the UFS device 2200, that is, even before receiving a notification that the previously transmitted command has been processed by the UFS device 2200, the UFS host 2100 may transmit a next command, which is on standby in the CQ, to the UFS device 2200. Thus, the UFS device 2200 may also receive the next command from the UFS host 2100 during the processing of the previously transmitted command. A maximum number (or queue depth) of commands that may be stored in the CQ may be, for example, 32. Also, the CQ may be implemented as a circular queue in which a start and an end of a command line stored in a queue are indicated by a head pointer and a tail pointer.

Each of the plurality of memory units 2221 may include a memory cell array (not shown) and a control circuit (not shown) configured to control an operation of the memory cell array. The memory cell array may include a 2D memory cell array or a 3D memory cell array. The memory cell array may include a plurality of memory cells. Although each of the memory cells is a single-level cell (SLC) configured to store 1-bit information, each of the memory cells may be a cell configured to store information of 2 bits or more, such as a multi-level cell (MLC), a triple-level cell (TLC), and a quadruple-level cell (QLC). The 3D memory cell array may include a vertical NAND string in which at least one memory cell is vertically oriented and located on another memory cell.

Voltages VCC, VCCQ1, and VCCQ2 may be applied as power supply voltages to the UFS device 2200. The voltage VCC may be a main power supply voltage for the UFS device 2200 and within a range of 2.4 V to 3.6 V. The voltage VCCQ1 may be a power supply voltage for supplying a low voltage mainly to the UFS device controller 2210 and be within a range of 1.14 V to 1.26 V. The voltage VCCQ2 may be a power supply voltage for supplying a voltage, which is lower than the voltage VCC and higher than the voltage VCCQ1, mainly to an I/O interface, such as the MIPI M-PHY 2251, and be within a range of 1.7 V to 1.95 V. The power supply voltages may be supplied through the regulator 2260 to respective components of the UFS device 2200. The regulator 2260 may be implemented as a set of unit regulators respectively connected to different ones of the power supply voltages described above.

Figure 11:
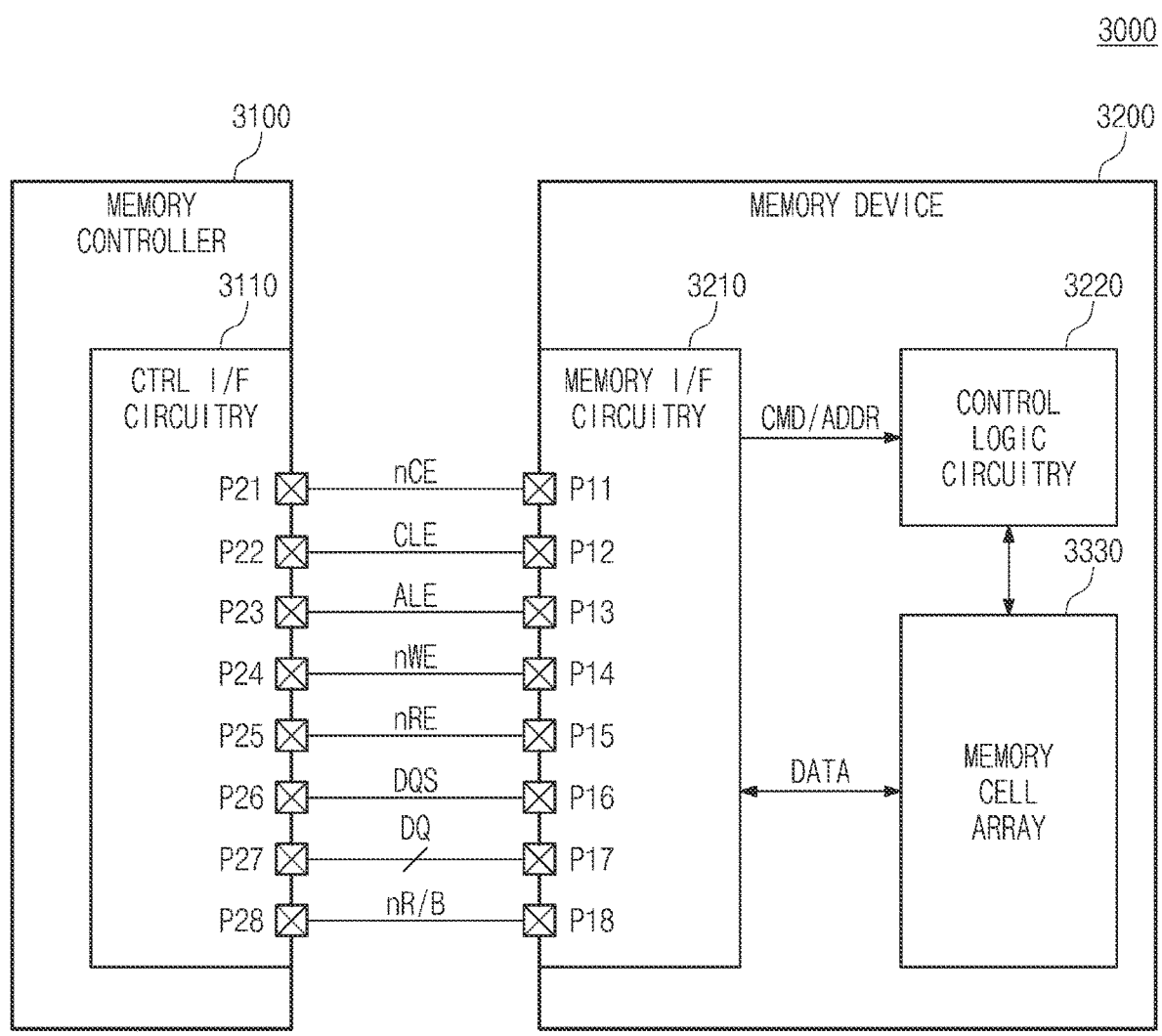
FIG. 11 is a block diagram of a storage system according to an embodiment of the present disclosure.

FIG. 11 is a block diagram of a storage system 3000 according to an embodiment of the present disclosure. Referring to FIG. 11, the storage system 3000 may include a storage device 3200 and a memory controller 3100. The storage device 3200 may correspond to one of the NVM devices NVM11 to NVMmn, which communicates with the memory controller 9100 based on one of the plurality of channels CH1 to CHm of FIG. 9. The memory controller 3100 may correspond to the memory controller 9100 of FIG. 9.

In some embodiments, the storage system 3000 may correspond to the device of storing data according to the exemplary embodiment of the present disclosure. For example, the storage device 300 may include the first type of memory cell and the second type of memory cell and the memory controller 3100 may store data according to the method described with reference to at least one of FIGS. 1 to 5.

The storage device 3200 may include first to eighth pins P11 to P18, a memory interface circuit 3210, a control logic circuit 3220, and a storage unit array 3330.

The memory interface circuit 3210 may receive a chip enable signal nCE from the memory controller 3100 through the first pin P11. The memory interface circuit 3210 may send and receive signals to and from the memory controller 3100 through the second to eighth pins P12 to P18 in response to the chip enable signal nCE. For example, when the chip enable signal nCE is in an enable state (e.g., low level), the memory interface circuit 3210 may send a signal to and receive a signal from the memory controller 3100 through the second to eighth pins P12 to P18.

The memory interface circuit 3210 may receive a command latch enable signal CLE, an address latch enable signal ALE, and a write enable signal nWE from the memory controller 3100 through the second to fourth pins P12 to P14. The memory interface circuit 3210 may receive the data signal DQ from the memory controller 3100 through the seventh pin P17 or send the data signal DQ to the memory controller 3100. Command CMD, address ADDR and data can be transmitted via data signal DQ. For example, the data signal DQ may be transmitted through a plurality of data signal lines. In this case, the seventh pin P17 may include a plurality of pins corresponding to a plurality of data signals DQ, respectively.

The memory interface circuit 3210 may obtain the command CMD from the data signal DQ received in the enable interval (e.g., a high-level state) of the command latch enable signal CLE based on a switching time point of the write enable signal nWE. The memory interface circuit 3210 may obtain the address ADDR from the data signal DQ received in the enable interval (e.g., a high-level state) of the address latch enable signal ALE based on the switching time point of the write enable signal nWE.

In an exemplary embodiment, the write enable signal nWE may remain static (e.g., a high level or low level) and switch between the high level and the low level. For example, the write enable signal nWE can be switched in the interval where the command CMD or address ADDR is sent. Therefore, the memory interface circuit 3210 can obtain the command CMD or address ADDR based on the switching time point of the write enable signal nWE.

The memory interface circuit 3210 may receive the read enable signal nRE from the memory controller 3100 through the fifth pin P15. The memory interface circuit 3210 may receive the data strobe signal DQS from the memory controller 3100 through the sixth pin P16 or may send the data strobe signal DQS to the memory controller 3100.

In the data (DATA) output operation of the storage device 3200, the memory interface circuit 3210 may receive the read enable signal nRE switched by the fifth pin P15 before outputting the data DATA. The memory interface circuit 3210 may generate a data strobe signal DQS, which is switched based on the switching of the read enable signal nRE. For example, the memory interface circuit 3210 may generate a data strobe signal DQS based on the switching start time of the read enable signal nRE, which starts switching after a predetermined delay (e.g., tDQSRE). The memory interface circuit 3210 may transmit a data signal DQ including data DATA based on the switching time point of the data strobe signal DQS. Therefore, the data DATA can be aligned with the switching time point of the data strobe signal DQS and transmitted to the memory controller 3100.

In the data (DATA) input operation of the storage device 3200, when the data signal DQ including data DATA is received from the memory controller 3100, the memory interface circuit 3210 may receive the switched data strobe signal DQ and the data DATA. The memory interface circuit 3210 may obtain the data DATA from the data signal DQ based on the switching time point of the data strobe signal DQS. For example, the memory interface circuit 3210 may sample the data signal DQ at the rising and falling edges of the data strobe signal DQS and obtain data DATA.

The memory interface circuit 3210 can send the ready/busy output signal nR/B to the memory controller 3100 through the eighth pin P18. The memory interface circuit 3210 may transmit status information of the storage device 3200 to the memory controller 3100 through the ready/busy output signal nR/B. When the storage device 3200 is in a busy state (i.e., when an operation is being performed in the storage device 3200), the memory interface circuit 3210 may send a ready/busy output signal nR/B indicating the busy state to the memory controller 3100. When the storage device 3200 is in a ready state (i.e., when no operation is performed or completed in the storage device 3200), the memory interface circuit 3210 may send the ready/busy output signal nR/B indicating the ready state to the memory controller 3100. For example, when the storage device 3200 reads data from the storage unit array 3330 in response to a page reading command, the memory interface circuit 3210 may send a ready/busy output signal nR/B indicating a busy state (e.g., a low level) to the memory controller 3100. For example, when the storage device 3200 programs the data DATA to the storage unit array 3330 in response to a programming command, the memory interface circuit 3210 may send the ready/busy output signal nR/B indicating the busy state to the memory controller 3100.

The control logic circuit 3220 may control all operations of the storage device 3200. The control logic circuit 3220 may receive a command/address CMD/ADDR obtained from the memory interface circuit 3210. The control logic circuit 3220 may generate control signals for controlling other components of the storage device 3200 in response to the received command/address CMD/ADDR. For example, the control logic circuit 3220 may generate various control signals for programming data DATA to or reading data DATA from the storage unit array 3330.

The storage unit array 3330 may store the data DATA obtained from the memory interface circuit 3210 via the control of the control logic circuit 3220. The storage unit array 3330 may output the stored data DATA to the memory interface circuit 3210 via the control of the control logic circuit 3220.

The storage unit array 3330 may include a plurality of storage units. For example, a plurality of storage units may be flash memory units. However, the present disclosure is not limited to this and the storage unit may be an RRAM unit, an FRAM unit, a PRAM unit, a thyristor RAM (TRAM) unit, or an MRAM unit. Hereinafter, an embodiment in which the storage unit is a NAND flash memory unit will be mainly described.

The memory controller 3100 may include first to eighth pins P21 to P28 and a controller interface circuit 3110. The first to eighth pins P21 to P28 may correspond to the first to eighth pins P11 to P18 of the storage device 3200, respectively.

The controller interface circuit 3110 may send the chip enable signal nCE to the storage device 3200 through the first pin P21. The controller interface circuit 3110 may send a signal to and receive a signal from the storage device 3200 through the second to eighth pins P22 to P28, wherein the storage device 3200 is selected by the chip enable signal nCE.

The controller interface circuit 3110 may send the command latch enable signal CLE, the address latch enable signal ALE and the write enable signal nWE to the storage device 3200 through the second to fourth pins P22 to P24. The controller interface circuit 3110 may send or receive the data signal DQ to or from the storage device 3200 through the seventh pin P27.

The controller interface circuit 3110 may transmit the data signal DQ including the command CMD or address ADDR and the switched write enable signal nWE to the storage device 3200. The controller interface circuit 3110 may transmit the data signal DQ including the command CMD to the storage device 3200 by transmitting the command latch enable signal CLE with the enable state. Moreover, the controller interface circuit 3110 may transmit the data signal DQ including the command CMD to the storage device 3200 through the address latch enable signal ALE having an enable state to transmit the data signal DQ including the address ADDR to the storage device 3200.

The controller interface circuit 3110 may send the read enable signal nRE to the storage device 3200 through the fifth pin P25. The controller interface circuit 3110 may receive the data strobe signal DQS from the storage device 3200 or send the data strobe communication signal DQS to the storage device 3200 through the sixth pin P26.

In the data (DATA) output operation of the storage device 3200, the controller interface circuit 3110 may generate the switched read enable signal nRE and send the read enable signal nRE to the storage device 3200. For example, before outputting the data DATA, the controller interface circuit 3110 may generate the read enable signal nRE from a static state (e.g., a high level or a low level). Therefore, the storage device 3200 can generate the switched data strobe signal DQS based on the read enable signal nRE. The controller interface circuit 3110 can receive the data signal DQ including the data DATA and the switched data strobe signal DQS from the storage device 3200. The controller interface circuit 3110 can obtain data DATA from the data signal DQ based on the switching time point of the data strobe signal DQS.

During the data (DATA) input operation of the storage device 3200, the controller interface circuit 3110 may generate a switched data strobe signal DQS. For example, before transmitting the data DATA, the controller interface circuit 3110 may generate a data strobe signal DQS from a static state (e.g., a high level or a low level), which may transmit the data signal DQ including the data DATA to the storage device 3200 based on the switching time point of the data strobe signal DQS.

The controller interface circuit 3110 may receive the ready/busy output signal NR/B from the storage device 3200 through the eighth pin P28. The controller interface circuit 3110 may determine the status information of the storage device 3200 based on the ready/busy output signal nR/B.

Figure 12:
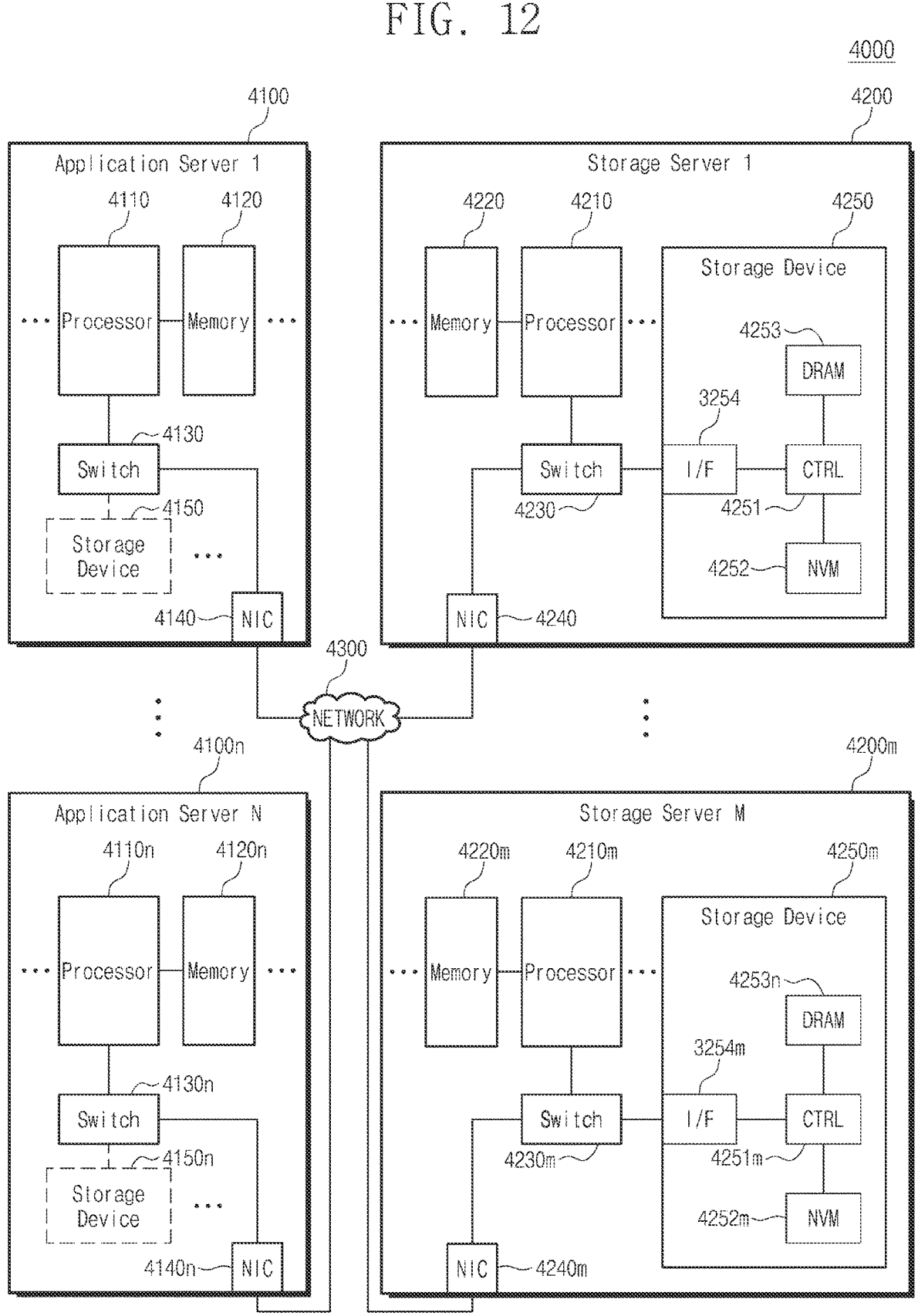
FIG. 12 is a block diagram of a data center to which a storage device is applied according to an embodiment of the present disclosure.

FIG. 12 is a block diagram of a data center 4000 to which a storage device is applied according to an embodiment of the present disclosure.

Referring to FIG. 12, the data center 4000 may be a facility for collecting various types of data and providing services and is referred to as a data storage center. The data center 4000 may be a system for operating search engines and databases and may be a computing system used by companies (such as banks) or government agencies. The data center 4000 may include application servers 4100 to 4100n and storage servers 4200 to 4200m. According to an embodiment, the number of applications 4100 to 4100n and the number of storage servers 4200 to 4200m can be selected differently. The number of application servers 4100 to 4100n and the number of storage servers 4200 to 4200m may be different from each other.

In some embodiments, the storage server 4200 and/or the application server 4100 may correspond to the device of storing data according to the exemplary embodiment of the present disclosure. For example, the storage server 4200 may include the first type of memory cell and the second type of memory cell and the application server 4100 or the storage server 4200 may store data according to the method of storing data described with reference to at least one of FIGS. 1 to 5.

The application server 4100 or the storage server 4200 may include processors 4110 and 4210 and at least one of memories 4120 and 4220. The storage server 4200 will now be described as an example. The processor 4210 may control all operations of the storage server 4200, access the memory 4220, and execute instructions and/or data loaded into the memory 4220. The memory 4220 may be a dual data rate synchronous DRAM (DDR SDRAM), a high bandwidth memory (HBM), a hybrid memory cube (HMC), a dual in-line memory module (DIMM), an optane DIMM, or a nonvolatile DIMM (NVMDIMM). In some embodiments, the number of processors 4210 and the number of memories 4220 included in the storage server 4200 may be selected differently. In one embodiment, the processor 4210 and the memory 4220 may provide a processor-memory pair. In one embodiment, the number of processors 4210 and the number of memories 4220 may be different from each other. The processor 4210 may include a single core processor or a multi-core processor. The above description of the storage server 4200 can be similarly applied to the application server 4100. In some embodiments, the application server 4100 may not include a storage device 4150. The storage server 4200 may include at least one storage device 4250. According to an embodiment, the number of storage devices 4250 included in the storage server 4200 may be selected differently.

Application servers 4100 to 4100n can communicate with storage servers 4200 to 4200m over network 4300. The network 4300 may be implemented by using fibre channel (FC) or Ethernet. In this case, FC can be a medium for relatively high-speed data transmission and optical switches with high performance and high availability can be used. According to an access method of the network 4300, the storage servers 4200 to 4200m can be set as file storage, block storage, or object storage.

In one embodiment, the network 4300 may be a network dedicated to storage, such as a storage area network (SAN). For example, a SAN may be a FC-SAN that uses an FC network and is implemented according to the FC protocol (FCP). As another example, the SA may be an Internet Protocol (IP)—SAN, which uses a transmission control protocol (TCP)/IP network and is implemented according to SCSI over TCP/IP or Internet SCSI (iSCSI) protocol. In another embodiment, the network 4300 may be a general-purpose network, such as a TCP/IP network. For example, the network 4300 may be implemented according to protocols such as FC (FCoE) over Ethernet, network attached storage (NAS), and fabric NVMe (NVMe-oF).

Hereinafter, the application server 4100 and the storage server 4200 will be mainly described. The description of the application server 4100 may be applied to another application server 4100*n*, and the description of the storage server 4200 may be applied to another storage server 4200*m*.

The application server 4100 may store the data requested to be stored by the user or the client in one of the storage servers 4200 to 4200*m* over the network 4300. In addition, the application server 4100 can obtain data requested to be read by a user or a client from one of the storage servers 4200 to 4200*m* over the network 4300. For example, the application server 4100 may be implemented as a network server or a database management system (DBMS).

The application server 4100 may access the memory 4120*n* or the storage device 4150*n* included in another application server 4100*n* over the network 4300. Alternatively, the application server 4100 may access the memories 4220 to 4220*m* or storage devices 4250 to 4250*m* included in the storage servers 4200 to 4200*m* over the network 4300. Therefore, the application server 4100 may perform various operations on the data stored in the application servers 4100 to 4100*n* and/or the storage servers 4200 to 4200*m*. For example, the application server 4100 may execute instructions for moving or copying data between the application servers 4100 to 4100*n* and/or the storage servers 4200 to 4200*m*. In this case, data may be moved from the storage devices 4250 to 4250*m* of the storage servers 4200 to 4200*m* through the memories 4220 to 4220*m* of the storage servers 4200 to 4200*m* or directly to the memories 4120 to 4120*n* of the application servers 4100 to 4100*n*. The data moved through the network 4300 may be data encrypted for security or privacy.

The storage server 4200 will now be described as an example. The interface 3254 may provide a physical connection between the processor 4210 and the controller 4251 and a physical connection between the network interface card (NIC) 4240 and the controller 4251. For example, the interface 3254 may be implemented using a direct attached storage (DAS) scheme, where the storage device 4250 is directly connected to a dedicated cable. For example, the interface 3254 can be implemented by using various interface schemes, such as ATA, SATA, E-SATA, SCSI, SAS, PCI, PCIe, NVMe, IEEE 1394, USB interface, SD card interface, MMC interface, eMMC interface, UFS interface, eUFS interface, and CF card interface.

The storage server 4200 may further include a switch 4230 and a network interconnect (NIC) 4240. The switch 4230 may selectively connect the processor 4210 to the storage device 4250 via the control of the processor 4210 or selectively connect the NIC 4240 to the storage device 4250. A corresponding switch 4130 and NIC 4140 are disposed in application server 4100 to operate in a similar manner.

In one embodiment, the NIC 4240 may include a network interface card and a network adapter. The NIC 4240 can be connected to the network 4300 through wired interface, wireless interface, Bluetooth interface, or optical interface. The NIC 4240 may include an internal memory, a digital signal processor (DSP), and a host bus interface and is connected to the processor 4210 and/or the switch 4230 through a host bus interface. The host bus interface may be implemented as one of the above examples of interface 3254. In one embodiment, the NIC 4240 may be integrated with at least one of processor 4210, switch 4230, and storage device 4250.

In storage servers 4200 to 4200*m* or application servers 4100 to 4100*n*, the processor may send commands to storage devices 4150 to 4150*n* and 4250 to 4250*m* or memories 4120 to 4120*n* and 4220 to 4220*m* and program or read data. In this case, the data can be the wrong data corrected by the ECC engine. The data may be data on which a data bus inversion (DBI) operation or a data masking (DM) operation is performed and may include cyclic redundancy coding (CRC) information. Data can be encrypted for security or privacy.

The storage devices 4150 to 4150*n* and 4250 to 4250*m* may send control signals and command/address signals to the NAND flash memory devices 4252 to 4252*m* in response to a read command received from the processor. Therefore, when reading data from the NAND flash memory devices 4252 to 4252*m*, the read enable (RE) signal can be input as the data output control signal. Therefore, the data can be output to the DQ bus. The RE signal can be used to generate the data strobe signal DQS. Depending on the rising or falling edge of the write enable (WE) signal, the command and address signals can be locked in the page buffer.

The controller 4251 may control all operations of the storage device 4250. In one embodiment, the controller 4251 may include an SRAM. The controller 4251 may write data to the NAND flash memory device 4252 in response to a write command or read data from the NAND flash memory device 4252 in response to a read command. For example, write commands and/or read commands may be provided from the processor 4210 of the storage server 4200, the processor 4210*m* of another storage server 4200*m*, or processors 4110 and 4110*n* of application servers 4100 and 4100*n*. The DRAM 4253 may temporarily store (or buffer) data to be written to or read from the NAND flash memory device 4252. Also, DRAM 4253 can store metadata. Here, the metadata may be user data or data generated by the controller 4251 for managing the NAND flash memory device 4252. The storage device 4250 may include a security element (SE) for security or privacy.

Exemplary embodiments of the disclosure may be applied to any storage apparatus including a non-volatile memory device. For example, exemplary embodiments of the disclosure may be applied to SSD, NVMe, eMMC, UFS, etc.

According to the method of storing data of the exemplary embodiment of the present disclosure, the data may be stored in the memory cell (e.g., a first type of memory cell or a second type of memory cell) corresponding to the write priority of data according to the write priority of data, therefore, the performance and/or user experience of storage devices using a plurality of types of memory cells can be improved.

According to the method of storing data of the exemplary embodiment of the present disclosure, the data may be stored in the memory cell (e.g., a first type of memory cell or a second type of memory cell) corresponding to the write priority of the data according to the write priority of the data determined based on the first the data feature of the data. Therefore, different write strategies may be used according to different the data (for example, the data that needs to be written quickly is written to the second type of memory cell with a high write speed, and the data that does not need to be written quickly is written to the memory cell with a low write speed), so that the maximum utilization of the first type of memory cell and the second type of memory cell can be achieved and the writing performance can be improved.

According to the method of storing the data of the exemplary embodiment of the present disclosure, when the application to which the data belongs is an application that needs to write the data quickly, the processor may determine the write priority of the data as a high write priority (for example, the second write priority) and write the data to the second type of memory cell with the high write speed. When the application to which the data belongs is an application that does not need to write the data quickly, the processor may determine the write priority of the data as a low write priority (e.g., the first write priority) and write the data to the first type of memory cell with the low write speed; therefore, the processor may use the first type of memory cell and the second type of memory cell more rationally based on the application to which the data belongs.

According to the method of storing the data of the exemplary embodiment of the present disclosure, the application to which the data belongs may be identified by the pre-trained application identification model; therefore, it is possible to accurately identify the application to which the data belongs.

According to the method of storing the data of the exemplary embodiment of the present disclosure, the data writing may be performed based on the optimal preset write strategy among a plurality of write strategies obtained through iterative testing; therefore, it is possible to improve the performance of the storage device.

According to the method of storing the data of the exemplary embodiment of the present disclosure, the second data feature with respect to different applications may be used to further determine the write priority of the data and the use of the first type of memory cell and the second type of memory cell can be optimized, thereby improving the write writing performance and service life.

According to the method of storing the data of the exemplary embodiment of the present disclosure, in the case where the write booster function is turned on, the data may be stored in the memory cell corresponding to the write priority of the data according to the write priority of the data, rather than writing all of the data to the second type of memory cell (e.g., SLC); therefore, the amount of the data written to the second type of memory cell may be reduced, thereby extending the lifetime of the second type of memory cell and improving the writing performance.

According to one or more exemplary embodiments, the above-described method may be implemented using hardware, a combination of hardware and software, or a non-transitory storage medium storing executable software for performing its functions.

Hardware may be implemented using processing circuitry such as, but not limited to, one or more processors, one or more Central Processing Units (CPUs), one or more controllers, one or more arithmetic logic units (ALUs), one or more digital signal processors (DSPs), one or more microcomputers, one or more field programmable gate arrays (FPGAs), one or more System-on-Chips (SoCs), one or more programmable logic units (PLUs), one or more microprocessors, one or more Application Specific Integrated Circuits (ASICs), or any other device or devices capable of responding to and executing instructions in a defined manner.

Software may include a computer program, program code, instructions, or some combination thereof, for independently or collectively instructing or configuring a hardware device to operate as desired. The computer program and/or program code may include program or computer-readable instructions, software components, software modules, data files, data structures, etc., capable of being implemented by one or more hardware devices, such as one or more of the hardware devices mentioned above. Examples of program code include both machine code produced by a compiler and higher level program code that is executed using an interpreter.

For example, when a hardware device is a computer processing device (e.g., one or more processors, CPUs, controllers, ALUs, DSPs, microcomputers, microprocessors, etc.), the computer processing device may be configured to carry out program code by performing arithmetical, logical, and input/output operations according to the program code. Once the program code is loaded into a computer processing device, the computer processing device may be programmed to perform the program code, thereby transforming the computer processing device into a special purpose computer processing device. In a more specific example, when the program code is loaded into a processor, the processor becomes programmed to perform the program code and operations corresponding thereto, thereby transforming the processor into a dedicated processor. In another example, the hardware device may be an integrated circuit customized into a dedicated circuitry (e.g., an ASIC).

A hardware device, such as a computer processing device, may run an operating system (OS) and one or more software applications that run on the OS. The computer processing device may also access, store, manipulate, process, and create data in response to execution of the software. For simplicity, one or more exemplary embodiments may be exemplified as one computer processing device; however, a hardware device may include multiple processing elements and multiple types of processing elements. For example, a hardware device may include multiple processors or a processor and a controller. In addition, other processing configurations are possible, such as parallel processors.

Software and/or data may be embodied permanently or temporarily in any type of storage media including, but not limited to, any machine, component, physical or virtual equipment, or computer storage medium or device, capable of providing instructions or data to, or being interpreted by, a hardware device. The software may also be distributed over network coupled computer systems so that the software is stored and executed in a distributed fashion. In particular, for example, software and data may be stored by one or more computer readable recording mediums, including tangible or non-transitory computer-readable storage media as discussed herein.

For example, according to an exemplary embodiment of the present disclosure, there is provided a computer-readable storage medium storing a computer program, wherein when the computer program is executed by a processor, at least the following method of storing data is implemented: determining the write priority of data; writing the data into the first type of memory cell, in response to the write priority of data corresponding to the first write priority; and writing the data into the second type of memory cell, in response to the write priority of data corresponding to the second write priority, wherein the second write priority is higher than the first write priority, and the write speed of the second type of memory cell is higher than the write speed of the first type of memory cell. In addition, other methods of the present disclosure can also be similarly implemented by a computer-readable storage medium storing the computer program.

Storage media may also include one or more storage devices of units and/or devices according to one or more exemplary embodiments. The one or more storage devices may be tangible or non-transitory computer-readable storage media, such as random access memory (RAM), read only memory (ROM), a permanent mass storage device (such as a disk drive), and/or any other similar data storage structure capable of storing and recording data. The one or more storage devices may be configured to store computer programs, program code, instructions, or some combination thereof, for one or more operating systems and/or for implementing the exemplary embodiments described herein. The computer programs, program code, instructions, or some combinations thereof, may also be loaded from a separate computer readable storage medium into the one or more storage devices and/or one or more computer processing devices using a drive mechanism. Such separate computer readable storage medium may include a Universal Serial Bus (USB) flash drive, a memory stick, a Blu-ray/DVD/CD-ROM drive, a memory card, and/or other like computer readable storage media. The computer programs, program code, instructions, or some combinations thereof, may be loaded into the one or more storage devices and/or the one or more computer processing devices from a remote data storage device via a network interface, rather than via a computer readable storage medium. Additionally, the computer programs, program code, instructions, or some combination thereof, may be loaded into the one or more storage devices and/or the one or more processors from a remote computing system that is configured to transfer and/or distribute the computer programs, program code, instructions, or some combination thereof, over a network. The remote computing system may transfer and/or distribute the computer programs, program code, instructions, or some combinations thereof, via a wired interface, an air interface, and/or any other like medium.

The one or more hardware devices, the storage media, the computer programs, program code, instructions, or some combination thereof, may be specially designed and constructed for the purposes of the exemplary embodiments, or they may be known devices that are altered and/or modified for the purposes of the exemplary embodiments.

As is traditional in the field, embodiments may be described and illustrated in terms of blocks which carry out a described function or functions. These blocks, which may be referred to herein as units or modules or the like, are physically implemented by analog and/or digital circuits such as logic gates, integrated circuits, microprocessors, microcontrollers, memory circuits, passive electronic components, active electronic components, optical components, hardwired circuits and the like, and may optionally be driven by firmware and/or software. The circuits may, for example, be embodied in one or more semiconductor chips, or on substrate supports such as printed circuit boards and the like. The circuits constituting a block may be implemented by dedicated hardware, or by a processor (e.g., one or more programmed microprocessors and associated circuitry), or by a combination of dedicated hardware to perform some functions of the block and a processor to perform other functions of the block. Each block of the embodiments may be physically separated into two or more interacting and discrete blocks without departing from the scope of the disclosure. Likewise, the blocks of the embodiments may be physically combined into more complex blocks without departing from the scope of the disclosure. An aspect of an embodiment may be achieved through instructions stored within a non-transitory storage medium and executed by a processor.

The contents described about are illustrative of exemplary embodiments and are not to be construed as limitations thereof. Although a few exemplary embodiments have been described, those skilled in the art will readily appreciate that many modifications are possible in the exemplary embodiments without materially departing from the novel teachings and advantages of the exemplary embodiments of the present disclosures. Accordingly, all such modifications are intended to be included within the scope of exemplary embodiments of the present disclosures as defined in the claims. Therefore, it is to be understood that the foregoing is illustrative of various exemplary embodiments and is not to be construed as limitation to the specific exemplary embodiments disclosed and that the modifications to the disclosed exemplary embodiments, as well as other exemplary embodiments, are intended to be included within the scope of the appended claims.

What is claimed is:

1. A method of storing data comprising:
    determining a write priority of data in response to a host's write request for the data, wherein determining the write priority comprises
        providing a first data feature characterizing the data as input to a trained classification model, wherein the first data feature comprises a file type and a synchronous write ratio,
        determining, as an output of the trained classification model, an application corresponding to the data, and
        determining the write priority based on the application and based on a second data feature characterizing the data, wherein the second data feature is a different type of data feature than the first data feature; and
    writing the data into a first type of memory cell in response to the write priority of the data being a first write priority, or
    writing the data into a second type of memory cell in response to the write priority of the data being a second write priority, wherein
    the second write priority is higher than the first write priority, and
    a write speed of the second type of memory cell is higher than a write speed of the first type of memory cell.

2. The method of claim 1, wherein the second data feature comprises at least one of time attribute information, a file system type, a synchronization identifier of a database file, a data synchronization identifier, a master device number, a slave device number, a logical block address sector number, a write data size, or a process priority.

3. The method of claim 1, comprising training the trained classification model using:
    as training data, data corresponding to the application, and
    as labels for the training data, a synchronous write ratio and a frequency degree of hot data and cold data.

4. The method of claim 1, wherein the trained classification model is configured to determine whether the data corresponds to an application for which the trained classification model has not been trained.

5. The method of claim 1, wherein determining the write priority based on the application and based on the second data feature characterizing the data is based on a preset write strategy that is specific to the application,
    wherein the preset write strategy comprises a relationship between the second data feature and the first write priority or the second write priority.

6. The method of claim 1, wherein the method is performed based on a write booster function being turned on.

7. A storage apparatus comprising:
a first type of memory cell and a second type of memory cell; and
a storage controller configured to store data by:
determining a write priority of the data in response to a host's write request for the data, wherein determining the write priority comprises
providing a first data feature characterizing the data as input to a trained classification model, wherein the first data feature comprises a file type and a synchronous write ratio,
determining, as an output of the trained classification model, an application corresponding to the data, and
determining the write priority based on the application and based on a second data feature characterizing the data, wherein the second data feature is a different type of data feature than the first data feature; and
writing the data into the first type of memory cell in response to the write priority of the data being a first write priority, or
writing the data into the second type of memory cell in response to the write priority of the data being a second write priority, wherein
the second write priority is higher than the first write priority, and
a write speed of the second type of memory cell is higher than a write speed of the first type of memory cell.

8. The storage apparatus of claim 7, wherein the storage controller includes a host processor.

9. The storage apparatus of claim 7, wherein the storage controller is included in a host.

10. The storage apparatus of claim 7, wherein the storage apparatus is included in a universal flash storage (UFS) system,
wherein the storage controller is included in a UFS host of the UFS system,
wherein the UFS system includes a UFS interface, and
wherein the first type of memory cell and the second type of memory cell are included in a UFS unit of the UFS system, the UFS unit configured to communicate with the UFS host via the UFS interface.

11. The storage apparatus of claim 7, comprising a data center comprising:
an application server; and
a storage server comprising the first type of memory cell and the second type of memory cell and configured to communicate with the application server over a network, wherein
the application server or the storage server includes the storage controller.

12. A device of storing data comprising:
a priority determination module configured to determine a write priority of data in response to a host's write request for the data, wherein the priority determination module is configured to determine the write priority by providing a first data feature characterizing the data as input to a trained classification model, wherein the first data feature comprises a file type and a synchronous write ratio,
determining, as an output of the trained classification model, an application corresponding to the data, and
determining the write priority based on the application and based on a second data feature characterizing the data, wherein the second data feature is a different type of data feature than the first data feature; and
a write module configured to:
write the data into a first type of memory cell in response to the write priority of the data being a first write priority, or
write the data into a second type of memory cell in response to the write priority of the data being a second write priority, wherein
the second write priority is higher than the first write priority, and
a write speed of the second type of memory cell is higher than a write speed of the first type of memory cell.

13. The device of claim 12, wherein the second data feature comprises at least one of time attribute information, a file system type, a synchronization identifier of a database file, a data synchronization identifier, a master device number, a slave device number, a logical block address sector number, a write data size, or a process priority.

14. The device of claim 12, wherein the trained classification model has been trained using:
as training data, data corresponding to the application, and
as labels for the training data, a synchronous write ratio and a frequency degree of hot data and cold data.

15. The device of claim 14, wherein the trained classification model is configured to determine whether the data corresponds to an application for which the trained classification model has not been trained.

16. The device of claim 14, wherein determining the write priority based on the application and based on the second data feature characterizing the data is based on a preset write strategy that is specific to the application,
wherein the preset write strategy comprises a relationship between the second data feature and the first write priority or the second write priority.

17. The device of claim 12, wherein the priority determination module is configured to determine the write priority of the data based on a write booster being turned on, in response to the host's write request for data.

* * * * *